(12) United States Patent
Iwano

(10) Patent No.: US 7,218,207 B2
(45) Date of Patent: May 15, 2007

(54) METHOD FOR DETECTING POSITION OF LANE MARKER, APPARATUS FOR DETECTION POSITION OF LANE MARKER AND ALARM APPARATUS FOR LANE DEVIATION

(75) Inventor: Hirotaka Iwano, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 682 days.

(21) Appl. No.: 10/646,725

(22) Filed: Aug. 25, 2003

(65) Prior Publication Data
US 2004/0042638 A1 Mar. 4, 2004

(30) Foreign Application Priority Data

Aug. 27, 2002 (JP) ............................. 2002-246859
May 23, 2003 (JP) ............................. 2003-146535

(51) Int. Cl.
*B60Q 1/00* (2006.01)
(52) U.S. Cl. ...................... 340/435; 340/436; 340/437; 340/937; 382/104; 382/199
(58) Field of Classification Search ...................... None
See application file for complete search history.

(56) References Cited

U.S. PATENT DOCUMENTS

| | | | |
|---|---|---|---|
| 5,638,116 A * | 6/1997 | Shimoura et al. ............ | 348/118 |
| 5,699,057 A * | 12/1997 | Ikeda et al. ................ | 340/937 |
| 6,009,377 A * | 12/1999 | Hiwatashi ................... | 701/301 |
| 6,091,833 A * | 7/2000 | Yasui et al. ................ | 382/104 |
| 6,546,118 B1 * | 4/2003 | Iisaka et al. ................ | 382/104 |
| 6,549,642 B1 * | 4/2003 | Sakurai ....................... | 382/104 |
| 6,553,130 B1 * | 4/2003 | Lemelson et al. .......... | 382/104 |
| 6,658,137 B1 * | 12/2003 | Yuhara et al. .............. | 382/104 |
| 6,813,370 B1 * | 11/2004 | Arai ............................ | 382/104 |
| 6,829,388 B1 * | 12/2004 | Sakurai ....................... | 382/199 |
| 6,850,629 B2 * | 2/2005 | Jeon ........................... | 382/104 |
| 6,879,706 B2 * | 4/2005 | Satoh et al. ................. | 382/104 |

FOREIGN PATENT DOCUMENTS

| | | |
|---|---|---|
| JP | 63-142478 | 5/1988 |
| JP | 3-99952 | 4/1991 |
| JP | 9-171348 | 6/1997 |
| JP | 2001-114048 | 4/2001 |
| JP | 2001-116567 | 4/2001 |

* cited by examiner

*Primary Examiner*—Daniel Wu
*Assistant Examiner*—Son Tang
(74) *Attorney, Agent, or Firm*—Morgan, Lewis & Bockius LLP

(57) ABSTRACT

A method for a detecting position of a lane marker relating to the present invention obtains an integral brightness by taking an image of a road surface (4) by a camera (2) loaded on a vehicle (3), converting the image taken by the camera (2) into an overlooked image and by integrating a brightness of a coordinate of a direction X which is in a direction perpendicular to a road width direction Y of the road surface (4) shown in the overlooked image which is converted. Thereafter, the method carries out a detection of a lane marker position provided on the road surface (4) by obtaining a position of the road surface (4) corresponding to the coordinate of the road width direction Y indicating a high integral brightness from a distribution of the detected integral brightness.

21 Claims, 17 Drawing Sheets

Background signal

Example of a relation

Example of distance between a lane marker and a vehicle

METHOD FOR DETECTING POSITION OF LANE MARKER, APPARATUS FOR DETECTION POSITION OF LANE MARKER AND ALARM APPARATUS FOR LANE DEVIATION

BACKGROUND OF THE INVENTION

1. Field of the Invention

The present invention relates to a method for detecting a position of a lane marker provided on a road surface, an apparatus for detecting a position of a lane marker and an alarm apparatus for a lane deviation.

2. Description of the Prior Art

Recently, for the purpose of avoiding an accident that occurs by drowsy driving or the like, there has been developed a system which prompts an attention to a driver by raising an alarm when a moving vehicle is deviated from a lane marker (lane, white line) provided on a road. As a method for recognizing a positional relation between the moving vehicle and the lane marker, a Hough transform method is often used for a method for detecting a position of the lane marker by extracting a direct-advancing element from an image of a road surface taken by a camera which is provided on a vehicle (for example, see Japanese Patent Laid Open S63-142478).

However, the aforementioned detecting method by use of the Hough transform method requires a calculation processing using a trigonometric function in which computational effort is large, therefore there are problems that a system having a high calculation processing ability is required, and it is difficult to achieve a process of detecting the position of lane marker in real time.

SUMMARY OF THE INVENTION

The present invention has been accomplished in view of the above mentioned circumstances, and it is an object of the invention to provide a method for detecting a position of a lane marker, an apparatus for detecting the position of the lane marker and an alarm apparatus for a lane deviation, which are capable of detecting the position of the lane marker provided on a road surface without performing a considerable amount of calculation processing.

To accomplish the aforementioned object, according to the method for detecting the position of the lane marker provided on the road surface, it comprises steps of photographing an image of the road surface by a camera loaded on a vehicle; converting the image of the road surface taken by the camera into an overlooked image; obtaining an integral brightness by integrating a brightness of a coordinate in a direction perpendicular to a direction of a road width of the road surface that is indicated on the converted overlooked image and detecting the integral brightness in every coordinate which is in the road width direction; and obtaining a position of the road surface corresponding to the coordinate in the road width direction in that a high integral brightness is indicated.

To accomplish the aforementioned object, according to the apparatus for detecting the position of the lane marker, it comprises overlooked view converting means for converting an image of a road surface taken by a moving vehicle into an overlooked image; brightness profile creating means for creating a brightness profile by obtaining an integral brightness which is obtained by integrating a brightness of a coordinate in a direction perpendicular to a road width direction of the road surface in the converted overlooked image and by detecting the integral brightness in every coordinate in the road width direction; high brightness coordinate detecting means for obtaining the coordinate in the road width direction indicating a high integral brightness from the brightness profile; and road surface position detecting means for obtaining a position of the road surface corresponding to the coordinate obtained by the high brightness coordinate detecting means.

The apparatus detects the position of the lane marker by the position of the road surface obtained by the road surface position detecting means.

To accomplish the aforementioned object, according to the alarm apparatus for the lane deviation, it comprises a device for detecting a position of a lane marker; distance calculating means for calculating a distance between a moving vehicle and a lane marker which is nearest to the moving vehicle by the position of the lane marker detected by the device for detecting the position of the lane marker; first alarm raising means for raising a different alarming sound to a driver corresponding to the distance calculated by the distance obtaining means.

The device for detecting the position of the lane marker is comprised of overlooked view converting means for converting an image of a road surface taken by the moving vehicle into an overlooked image; brightness profile creating means for creating a brightness profile by obtaining an integral brightness which is obtained by integrating a brightness of a coordinate in a direction perpendicular to a road width direction of the road surface in the converted overlooked image and by detecting the integral brightness in every coordinate in the road width direction; high brightness coordinate detecting means for obtaining the coordinate in the road width direction indicating a high integral brightness from the brightness profile; and road surface position detecting means for obtaining a position of the road surface corresponding to the coordinate obtained by the high brightness coordinate detecting means.

DETAILED DESCRIPTION OF THE PREFERRED EMBODIMENTS

<Embodiment 1>

Figure 1:
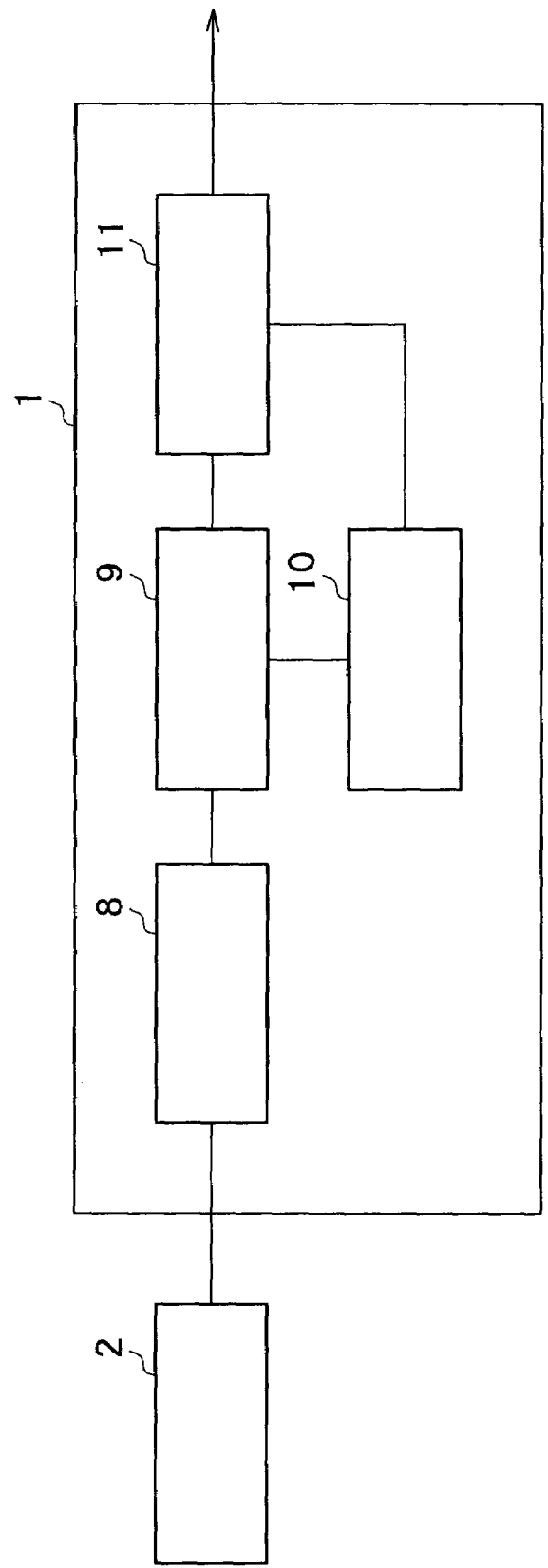
FIG. 1 is a block diagram showing a camera and an apparatus for detecting a position of a lane marker relating to an embodiment 1.

An apparatus for detecting a position of a lane marker according to an embodiment 1 will be described hereunder with reference to the accompanying drawings. FIG. 1 is a block diagram to show the apparatus for detecting the position of the lane marker 1 relating to the present invention and a camera 2.

Figure 2:
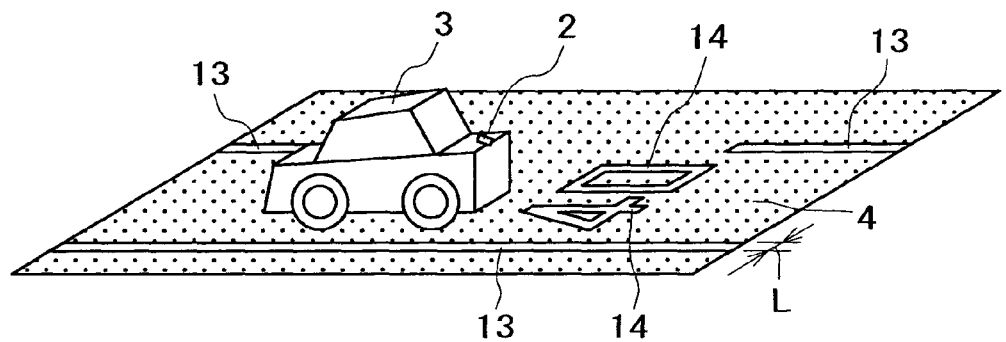
FIG. 2 is a perspective view showing a general position of a camera provided on a vehicle.

The camera 2 is a CCD camera capable of shooting widely provided with a wide-angle lens and loaded onto a rear part of a vehicle 3 as shown in FIG. 2. The camera 2 is disposed in such a manner as to obliquely overlook a road surface 4 which is at right behind the vehicle. The road surface 4 is imaged so that frames 6 and 7 at above and below of the camera 2 become substantially parallel with a horizontal line 5 (it does not become completely parallel when using the wide-angle lens) like an image indicated in FIG. 3, and the image becomes such an image that a peripheral part is curved compared with a center part.

Figure 3:
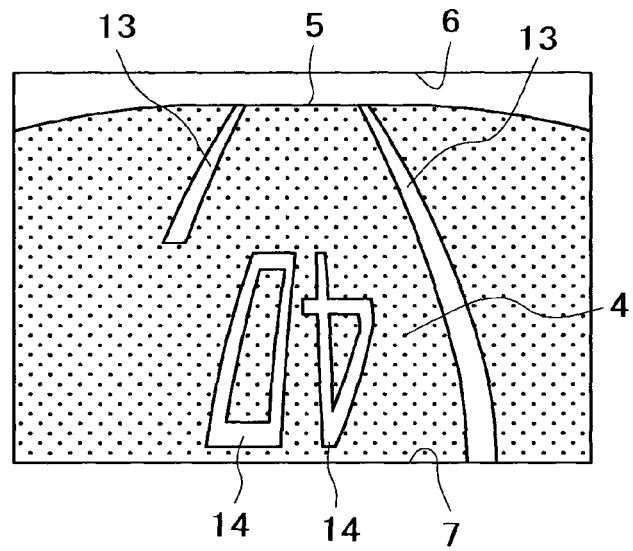
FIG. 3 is a view showing an image of a road surface imaged by using a wide-angle lens.
Figure 4:
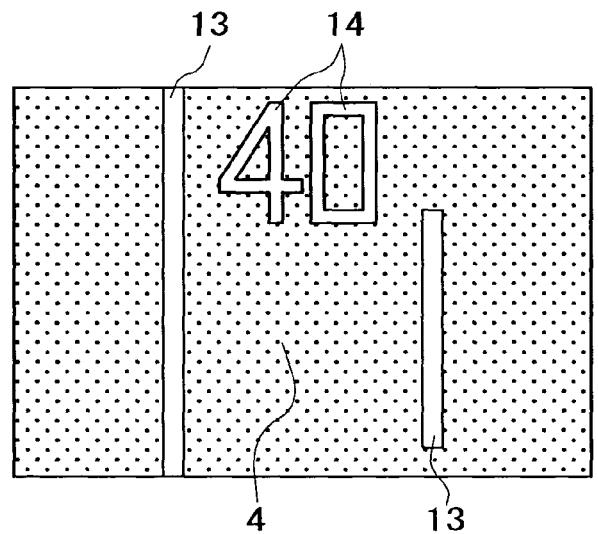
FIG. 4 is a view showing an image in which the road surface image shown in FIG. 3 is converted into an overlooked view.

The apparatus for detecting the position of the lane marker 1 provided with an overlooked view converting unit 8, an intensity profile creating unit 9, a memory unit 10 and a lane marker detecting unit 11. The overlooked view converting unit 8 corrects a distortion of the image of the road surface which is taken by the camera 2, and for converting the corrected image into an overlooked image which is an image that overlooks direct underneath from an upper part of the vehicle 3. Also, the overlooked view converting unit 8 enlarges or shrinks the image if required. For example, the overlooked view converting unit 8 converts the image of the road surface as shown in FIG. 3 into the image overlooked and then the converted overlooked image is displayed as shown in FIG. 4. In addition, an art to convert the photographed image into the overlooked image is disclosed in Japanese Patent Laid Open Nos. H3-99952, H9-171348, 2001-114048 and 2001-116567, therefore its description is omitted as it is well known.

The intensity profile creating unit 9 inputs the overlooked image that is converted by the overlooked view converting unit 8. The intensity profile creating unit 9 determines the overlooked image by setting a direction of a road width of the road surface which is indicated in the overlooked image as a direction of a horizontal axis Y and a direction perpendicular to the horizontal axis Y as a direction of a vertical axis X. Then the intensity profile creating unit 9 obtains an integral brightness by integrating brightness in the vertical axis X direction and creates an intensity profile (brightness profile) which the integral brightness is arranged in every coordinate (pixel) of the horizontal axis Y. Since the overlooked image is constituted by a group of a plurality of pixel arranged in the X direction and the Y direction, the integral brightness can be obtained from every pixel arranged in the Y coordinate of the horizontal axis. When the vehicle 3 drives a straight road, a direction of a lane marker 13 (for example, center line or boundary line) formed on the road surface extending become as the direction of the vertical X direction since the camera 2 is loaded in such a manner as to image the right behind of the vehicle 3. The memory unit 10 stores the intensity profile created by the intensity profile creating unit 9 and stores data such as a specified width L of the common lane marker 13.

Figure 5A:
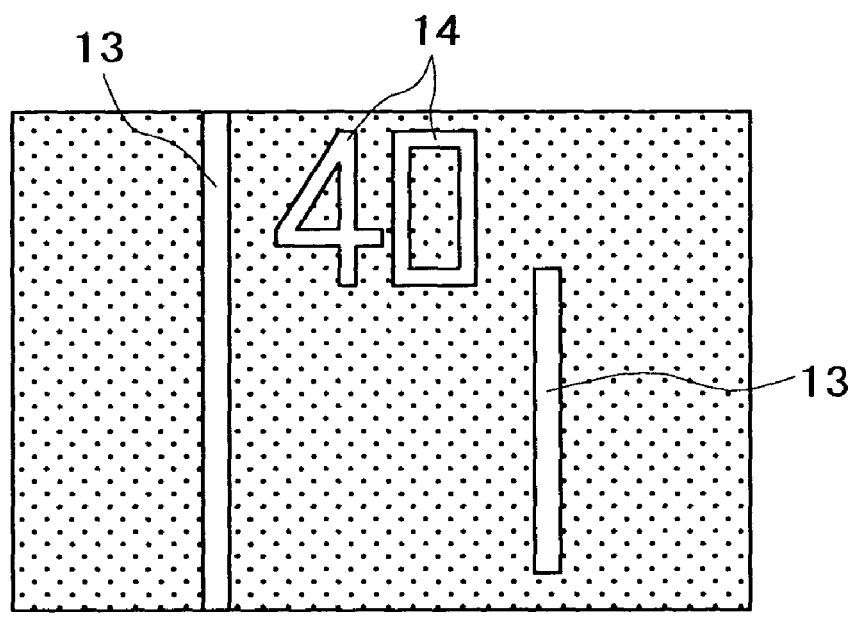
FIG. 5A is a view showing the image shown in FIG. 4.
Figure 5B:
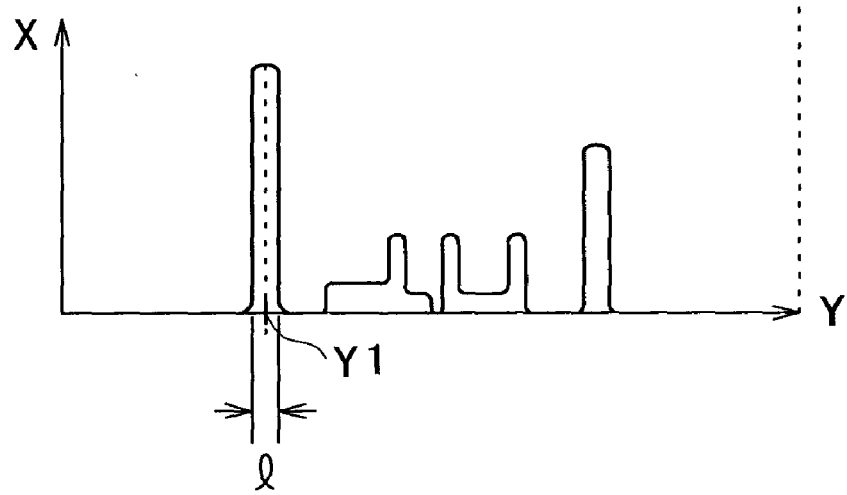
FIG. 5B is a graph of the intensity profile indicating a value of an integral brightness corresponding to a horizontal axis coordinate in FIG. 4.

FIG. 5B is a graph indicating the intensity profile to the overlooked image shown in FIG. 4 (FIG. 5A). Although the lane marker 13 is generally depicted in bright colors having high brightness like white or yellow, such colors having low brightness like gray are used on the road surface 4. Therefore, when comparing a position having the lane marker 13 with a position not having the lane marker 13 in the overlooked image, the integral brightness in the coordinate having the lane marker 13 indicates a distinctly high value. For example, the coordinate indicates the highest integral brightness in the intensity profile shown in FIG. 5B corresponds to the coordinate on the horizontal axis Y of the lane marker 13 which is indicated in such a manner as to extend in the vertical X direction of the image in FIG. 4 (FIG. 5A).

It is possible to widen a difference of the integral brightness between the lane marker 13 and other lane markers 14 (designs or markers such as speed limit indications that are provided on the road, for example "40" in FIG. 4 and FIG. 5A) since a length of an indication of the other markers 14 become relatively shorter than a displayed length of the vertical X direction of the lane marker 13 by widening an area that the overlooked image can be displayed with shrinking the overlooked image by the overlooked view converting unit 8.

Figure 6:
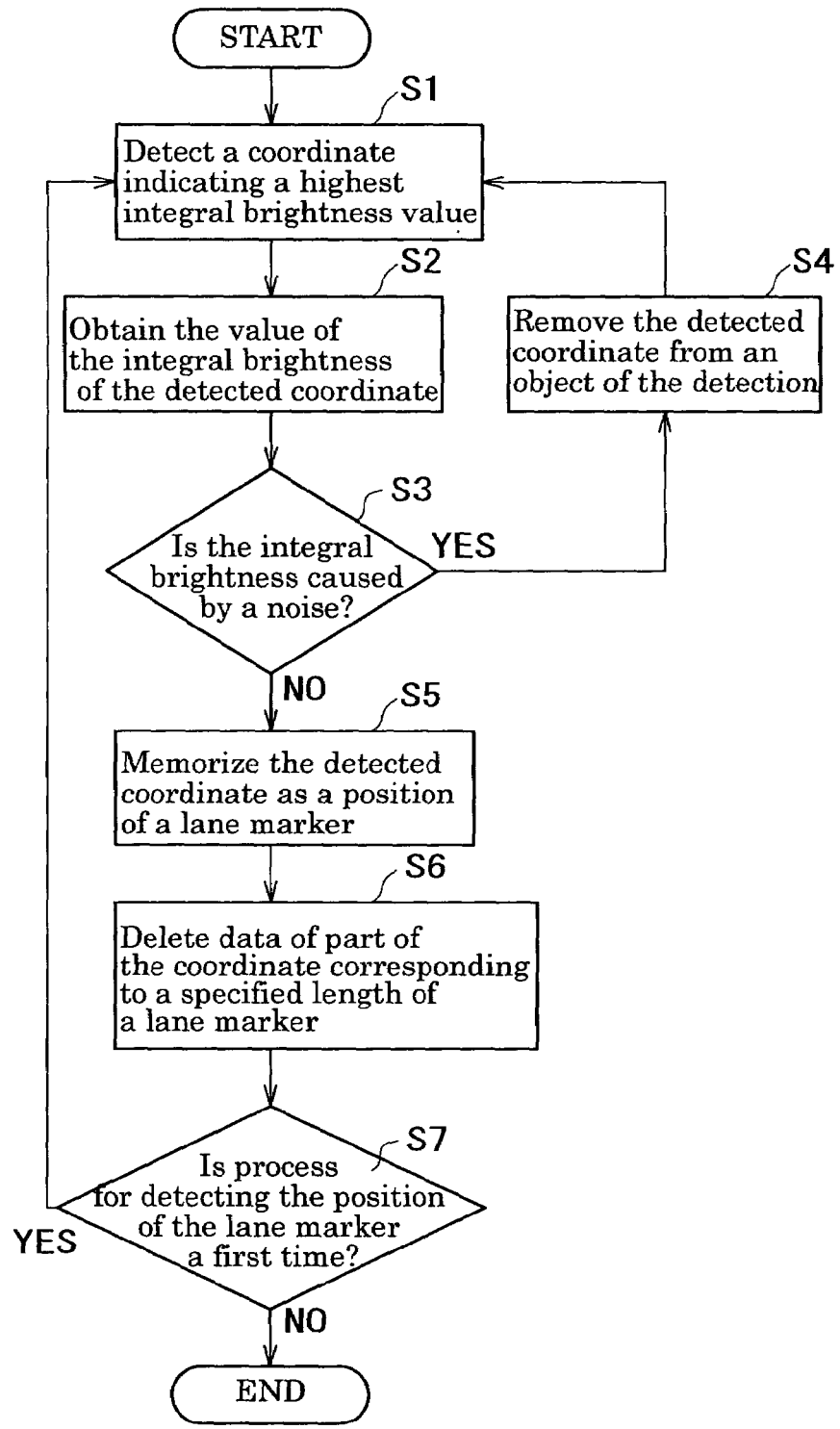
FIG. 6 is a first flowchart showing a process in a lane marker detecting unit.

The lane marker detecting unit 11 obtains the coordinate which is on the horizontal axis Y that indicates the high integral brightness in the intensity profile and determines the position of the lane marker 13 from the obtained coordinate. A flowchart shown in FIG. 6 is a first flowchart showing a process of detecting the position of the lane marker in the lane marker detecting unit 11.

First of all, the lane marker detecting unit 11 detects the coordinate of the horizontal axis Y (for example, it is Y1 in the intensity profile shown in FIG. 5) that indicates the highest value of the integral brightness from the intensity profile (step S1), and retrieve the obtained coordinate and the value of the integral brightness of the coordinate in proximity of the obtained coordinate (step S2). Then the lane marker detecting unit 11 determines whether the integral brightness is generated by a noise or a data other than the noise (correct data) from the obtained value of the integral brightness (step S3). To be more precise, the lane marker detecting unit 11 compares the integral brightness of the detected coordinate between the integral brightness of the coordinate that is in adjacent to the coordinate thereto, and when the integral brightness between the detected coordinate and the adjacent coordinate indicate almost the same value, then the lane marker detecting unit 11 determines that it is the correct data, since it can be considered that the coordinate indicating the similar integral brightness to the specified width L of the lane marker 13 is continued. In addition, the lane marker detecting unit 11 determines that it is generated by the noise when only either of the detected coordinate or the coordinate that is adjacent to the detected coordinate indicates the exceedingly high integral brightness.

When the lane marker detecting unit 11 judges that the integral brightness of the indicated coordinate is generated by the noise, then it removes the integral brightness of that coordinate from an object for the detection of the coordinate (step S4) and carries out the detection of the coordinate indicating the highest integral brightness again (step S1). When the lane marker detecting unit 11 judges that the integral brightness of the detected coordinate is the correct data (which means that it is not the noise), it stores it to the memory unit 10 by determining that the detected coordinate is the position of the lane marker (step 5). Then, the lane marker detecting unit 11 deletes a data of the integral brightness of the coordinate of a coordinate width which corresponds to the specified width L of the lane marker 13 by setting the position of the lane marker as a center (step S6), and repeats the same process again if the process of detecting the position of the lane marker is a first time and completes the process if it is not the first (if the process is after a second time) time (step S7).

If the process is the first time, the lane marker detecting unit 11 obtains the coordinate that indicates the highest integral brightness except for the coordinate detected for the first time (step S1, step S2), then detects a position of a second lane marker after determining that the integral brightness of the obtained coordinate is whether or not generated by the noise (step S3) and records to the memory unit 10 (step S5). Generally, since the lane marker 13 is provided on right and left sides of the road, it is possible to detect the position of the lane marker at the right and left sides by determining the position of the lane marker twice.

As described above, the apparatus for detecting the position of the lane marker 1 is capable of detecting the position of the lane marker without carrying out the considerable amount of calculation such as carrying out the trigonometric function by creating the intensity profile after the photographed image is converted into overlooked view by using the overlooked view converting process and detecting the position of the lane marker by obtaining the coordinate indicating the highest integral brightness, so it is possible to detect the position of the lane marker faster by using a simpler system than a case detecting the position of the lane marker by a process of extracting a direct-advancing element utilizing a Hough transform method.

In particular, the apparatus for detecting the position of the lane marker 1 relating to the embodiment 1 is more suited for detecting the position of the lane marker at the area relatively close to the vehicle 3 than detecting the position of the lane marker in the distance since it creates the overlooked image according to the image of the road surface at a vicinage of the vehicle 3, therefore it becomes the most suitable detecting apparatus for a system such as a system for alarming a lane deviation.

Figure 7:
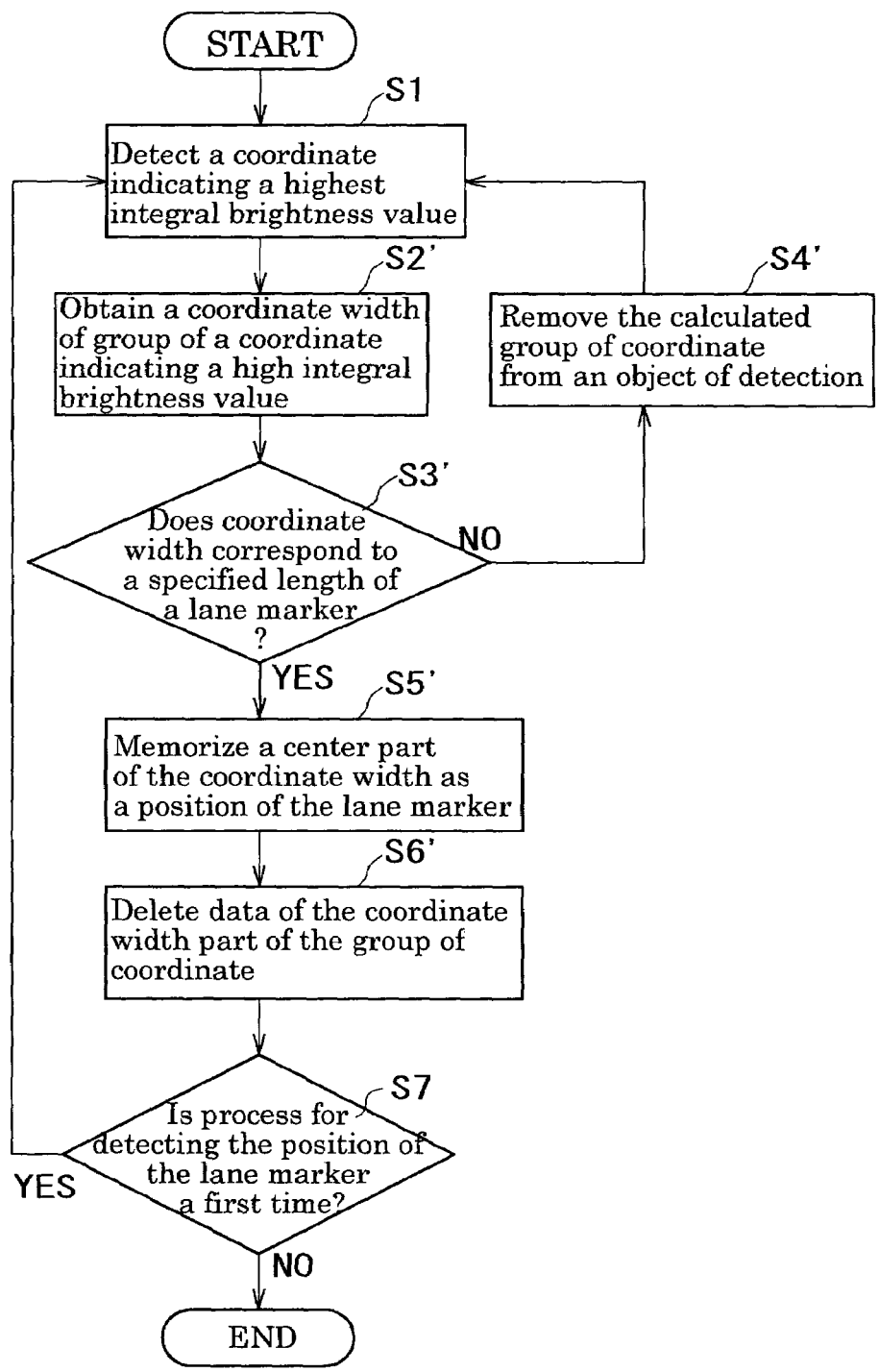
FIG. 7 is a second flowchart showing the process in the lane marker detecting unit.

The flowchart shown in FIG. 7 is a second flowchart showing the process of detecting the position of the lane marker in the lane marker detecting unit 11. Although the detecting process of the position of the lane marker is carried out by obtain the coordinate indicating the highest integral brightness in the first flowchart, there is a difference in the second flowchart in that the detecting process of the position of the lane marker is carried out by obtaining the coordinate width (pixel width) 1 (small alphabet L) of group of the coordinate which is the coordinate having the highest integral brightness as well as the coordinate proximity to thereto and indicates the relatively higher integral brightness than the other coordinate, and then comparing the coordinate width l with the specified width L of the lane marker. The description will be made with giving the same reference numerals to the processes same as in the first flowchart shown in FIG. 6.

First of all, the lane marker detecting unit 11 detects the coordinate indicating the highest integral brightness from the intensity profile (step S1) and obtains the group of coordinate width l indicating a value of the high integral brightness by obtaining the value of the integral brightness of the detected coordinate and the coordinate proximity to thereto (step S2'). Then, the lane marker detecting unit 11 detects whether or not the obtained coordinate width is similar width to the specified width L of the lane marker 13 that is stored in the memory unit 10 by considering a change of the value of the integral brightness to whole coordinate of the horizontal axis Y (step S3'). When the lane marker detecting unit 11 judges that the obtained coordinate width l does not correspond to the specified width L of the lane marker 13, then it removes the integral brightness of the corresponding coordinate from an object for the detection of the coordinate (step S4') and carries out the detection of the coordinate indicating the highest integral brightness again (step S1).

When the lane marker detecting unit 11 judges that the obtained coordinate width l and corresponding specified width L of the lane marker 13 are similar width, it stores the fact to the memory unit 10 by determining that the coordinate at a center part of the coordinate width l as the position of the lane marker (step S5'). Then, the lane marker detecting unit 11 deletes a data of the integral brightness of the group of coordinate from the intensity profile (step S6'), and repeats the same process again if the process of detecting the position of the lane marker is the first time and completes the process if it is not the first (if the process is after the second time) time (step S7).

As described above, the apparatus for detecting the position of the lane marker 1 is capable of detecting the position of the lane marker without carrying out the considerable amount of calculation such as carrying out the trigonometric function by creating the intensity profile after carrying out the converting of the image to overlooked view by using the overlooked view converting process and detecting the position of the lane marker by obtaining the coordinate width of the group of coordinate having the high integral brightness.

It is, therefore, possible to detect rapidly the position of the lane marker by using a system simpler than a case detecting the position of the lane marker by a process of extracting a direct-advancing element utilizing the Hough transform method as similar to the process shown in the first flowchart. In addition, the apparatus for detecting the position of the lane marker 1 can carry out the process in real time easily as it is not necessary to carry out the considerable amount of obtaining process.

Furthermore, the apparatus for detecting the position of the lane marker 1 becomes easier to determine the difference between the lane marker and the other marker (designs or markers such as speed limit indications that are provided on the road) since it carries out the detecting process of the position of the lane marker according to the coordinate width of the group of coordinate, therefore it becomes easy to reduce the false detection of the position of the lane marker.

<Embodiment 2>

Figure 8:
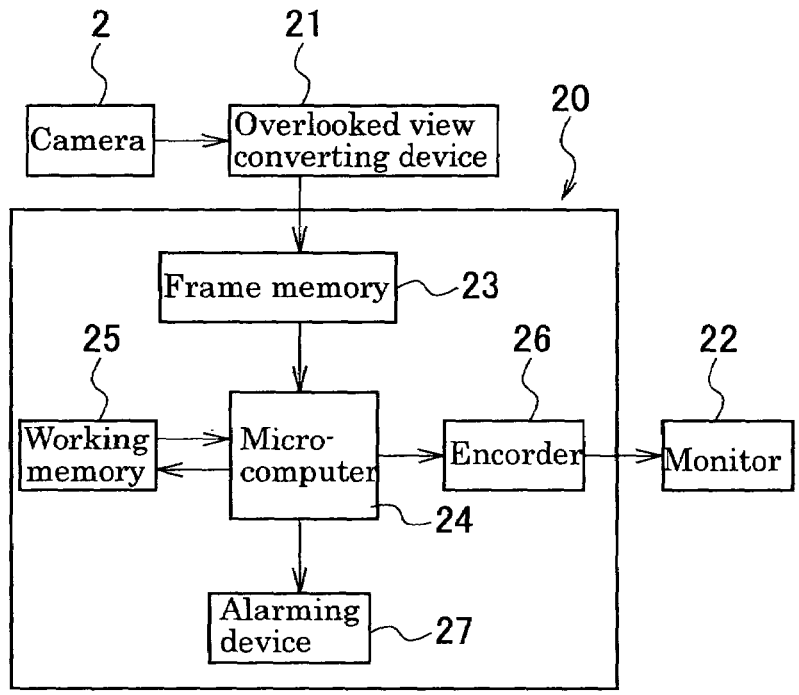
FIG. 8 is a block diagram showing the camera, an overlooked view converting device, an alarm apparatus for the lane deviation and a monitor relating to an embodiment 2.

Hereinafter an alarm apparatus for a lane deviation will be described with reference to the accompanying drawings. As shown in FIG. 8, the alarm apparatus for the lane deviation 20 is connected with an overlooked view converting device 21 and a monitor 22. The overlooked view converting device 21 carries out the process corresponding to the overlooked view converting unit 8 described in the embodiment 1. The overlooked view converting device 21 creates the overlooked image shown in FIG. 4 by applying an observing point conversion to such an image shown in FIG. 3 that is taken by the camera 2.

The alarm apparatus for the lane deviation 20 is provided with a frame memory 23, a microcomputer 24, a working memory 25, an encorder 26 and an alarm apparatus 27. The alarm apparatus for the lane deviation 20 creates the intensity profile by using the overlooked image created by the overlooked view converting device and raises an alarm regarding the lane deviation to a driver if necessary by detecting a positional relation between the vehicle 3 and the lane marker 13 by using the created intensity profile.

The frame memory 23 is a memory which is used to synchronize when creating the intensity profile. The overlooked image created by the overlooked view converting device is stored in the frame memory 23. By the way, there may be a case that a line memory is used as a substitute for the frame memory 23 in light of processing speed of the microcomputer 24, cost or the method for creating the intensity profile for example. The case that the line memory is used will be described later.

The microcomputer 24 creates the intensity profile by using the overlooked image stored in the frame memory 23. In addition, the microcomputer 24 obtains a traveling speed (traversing speed) to a direction of width of the vehicle 3 by detecting a steering angle of a steering wheel using a steering angle sensor which is not shown and by obtaining speed information using a velocity sensor which is not shown. By the way, there has been known a method for obtaining the traversing speed by using a method to extract vehicle information using vehicle-mounted information equipment such as the steering angle sensor and the velocity sensor, or a method for obtaining the traversing speed by an image processing. In the case of the alarm apparatus for the lane deviation 20, the microcomputer 24 is capable of determining whether the vehicle 3 is getting closer to or getting away from the lane marker 13 by using the steering angle sensor and capable of obtaining the traversing speed quantitatively by using the velocity sensor. In the vehicle 3 that is provided with the vehicle-mounted information equipment such as a navigation device, it is possible to provide the microcomputer 24 so as to detect the traversing speed by obtaining the information regarding a movement of the vehicle 3 since the movement of the vehicle 3 can be checked at all times by using, for example, a yaw rate sensor (acceleration sensor).

By the way, the speed of the obtaining process of the traversing speed varies according to a processing ability of the microcomputer 24 when carrying out a method of obtaining the traversing speed by the image processing. For example of the method utilizing the image processing to obtain the traversing speed, track the position of the lane marker which is on the screen in every frame and check a moving distance at an inter-frame so as to carry out the detection to detect whether the vehicle 3 is getting closer or getting away from a white line in every frame. The speed can be determined since the time of inter-frame is approximately 30 m/sec.

Figure 9:
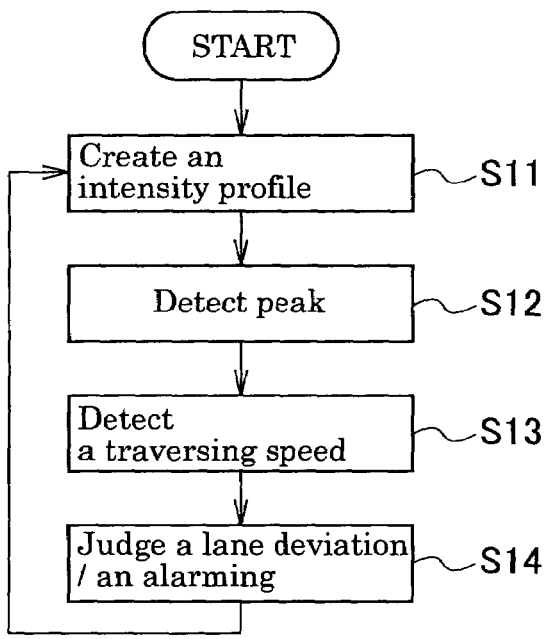
FIG. 9 is a flowchart showing a process that a microcomputer of the alarm apparatus for the lane deviation carries out.

Moreover, the microcomputer 24 determines whether or not the vehicle 3 is not deviated the lane by using a result of the detection of the traversing speed of the vehicle 3 and the result of the intensity profile obtained by the overlooked image. When the microcomputer judges that the vehicle is deviating the lane, the microcomputer 24 raises an alarm to the driver by using the alarm apparatus 27. To be more precise, the microcomputer 24 determines whether or not the vehicle 3 is moving to a sideling direction to the detected position of the lane marker at over predetermined speed, by creating the intensity profile by the overlooked image (step S11) and detecting a peak position of the integral brightness where the position of the lane marker is detected (step S12) and detecting the aforementioned traversing speed (step S13) as shown in FIG. 9. When the microcomputer 24 determines that a possibility the vehicle deviates the lane is high, then the microcomputer 24 raises the alarm by using the alarm apparatus 27 (step S14).

Generally, an acoustic alarm device which raises a buzzer sound is used for the alarm apparatus 27, but it is also possible to display a warning message on the monitor 22 by converting it into an analog signal through the encorder 26 if necessary. Therefore, when raising the alarm with only the acoustic alarm device, the encorder 26 or the monitor 22 shown in FIG. 8 is not required.

Hereinafter, a method to reduce a false recognition of the lane marker and a method that is used when the vehicle 3 deviated the lane (lane marker) 13 in the detection using the alarm apparatus for the lane deviation 20 will be described.

At first, a description on a method for converting an image for enhancing a detection accuracy of the lane marker 13 will be made hereunder.

In the alarm apparatus for the lane deviation 20 relating to the present invention, the overlooked image provided with a ratio of up-down to right-left or an aspect ratio in overlooked image, which is proper for detecting the lane marker 13 is used to create the intensity profile.

Figure 11:
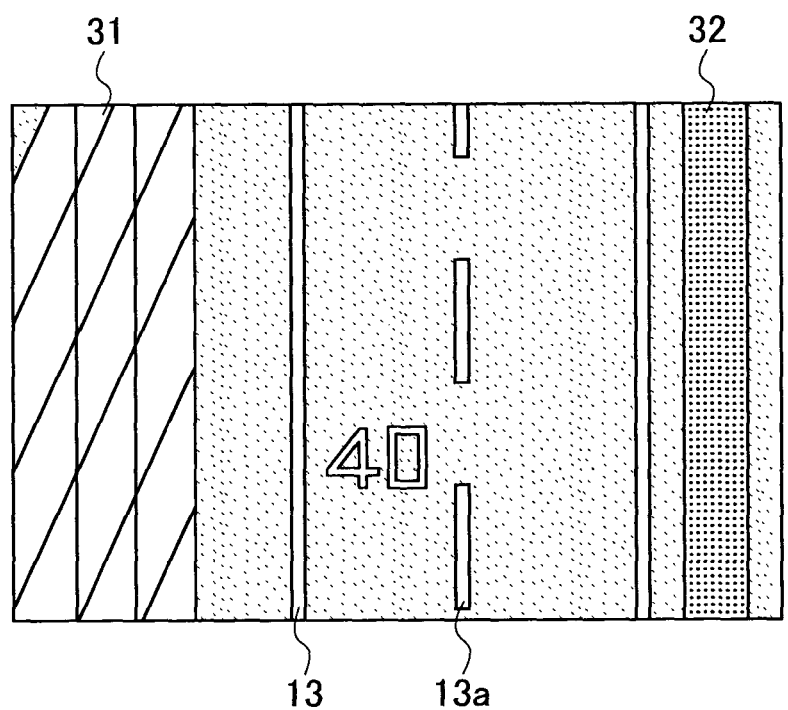
FIG. 11 is a view showing the overlooked image of a wide range formed by the overlooked view converting device.

Heretofore, the microcomputer 24 has used the overlooked image having the aspect ratio having equivalent magnification created by the overlooked view converting device 21 to create the intensity profile. On this account, in the overlooked image, when attempting to create the overlooked image having a wide ranged displayed area by setting a position of a point of view in a process of converting the point of view to a higher position so as to overlook the lane marker 13 at forward of the vehicle, the displayed area not only widens to a direction of extending along the road (longitudinal direction) but also widens to a direction of the road-width (lateral direction). For example, not only the images of the lane markers 13 and 13a but also the images such as a side wall 31 or a median 32 intrude in the overlooked image as shown in FIG. 11. It is extremely difficult for the microcomputer 24 to carry out the determination of the position of the lane marker 13 by using the intensity profile created by the above method, since the intensity profile is created by using the above mentioned overlooked image, the integral brightness (hereinafter, intensity) other than the lane markers 13 and 13a such as the side wall 31 or the median 32 appears on the intensity profile.

Figure 10:
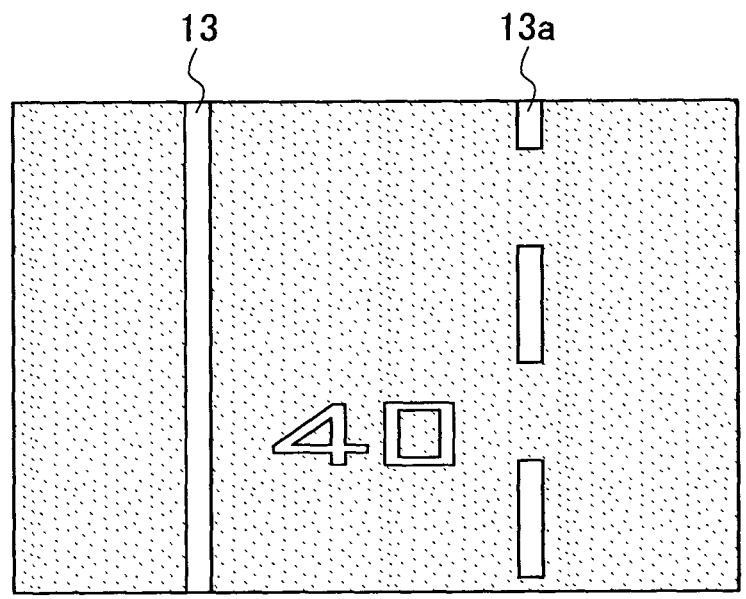
FIG. 10 is a view showing an overlooked image which is compressed in a longitudinal direction.

Given this factor, the microcomputer 24 is capable of inputting only the lane marker necessary for the lane marker detection in wide range to a direction that the vehicle moves without causing the side wall 31 or the median 32 to generate the false recognition to the overlooked image as shown in FIG. 10, by extracting the overlooked image with limiting the width thereof to approximately 1 m to 1.5 m width of the vehicle 3 at the step the overlooked image is created by the overlooked view converting device 21 prior to the creation of the intensity profile, and by further compressing the extracted overlooked image to the moving direction of the vehicle (longitudinal direction).

By using an art of creating the overlooked image by compressing the image of the moving direction of the vehicle to the image of the direction of the road-width by the microcomputer 24 (art of non-equivalent magnification of the overlooked image), the alarm apparatus for the lane deviation 20 is capable of detecting the intensity value of the lane width of the lane marker 13 even more higher when creating the intensity profile and is capable of suppressing the detection of other peak intensity that provokes the false recognition.

Figure 12:
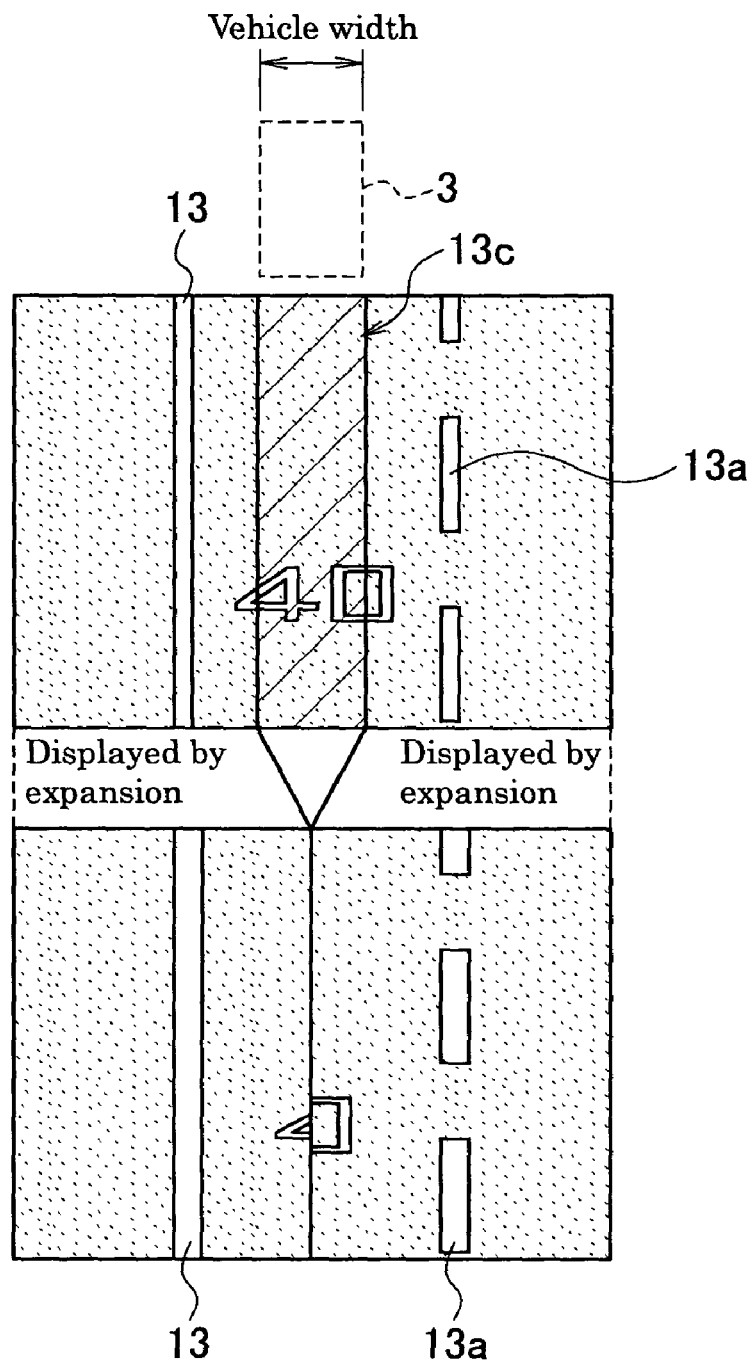
FIG. 12 is a view showing the overlooked image which is magnified and formed by connecting separated overlooked images together.

Also, as shown in FIG. 12, it may also be recommendable to delete a part 13c which is a similar width to the vehicle width and extending in the moving direction of the vehicle (longitudinal direction), and the microcomputer 24 slightly magnifies separated overlooked images which are separated in right and left and connects them together so as to create a new overlooked image. By creating the intensity profile by using the overlooked image created by the aforementioned method (art of separation overlooked images), it is possible to avoid the detection of the various markers that are depicted in the vicinity of the center of the lane such as the speed limit indications (relevant to "40" in FIG. 12) as the peak intensity when creating the intensity profile.

Additionally, it is possible to enhance the detecting accuracy of the position of the lane markers 13 and 13a by the alarm apparatus for the lane deviation 20 easily since the lane markers 13 and 13a are also magnified to be displayed by the magnification of the divided overlooked images.

Still additionally, the alarm apparatus for the lane deviation 20 is capable of using the created overlooked image as an effective determining element in the determination of the deviation of the vehicle 3, since it can be determined that the vehicle 3 is deviated the lane when part of the lane marker is not displayed in the overlooked image which the part of the vehicle-width is deleted.

As described above, the alarm apparatus for the lane deviation 20 is capable of enhancing the detecting accuracy of the position of the lane marker by processing the overlooked image used when creating the intensity profile by using the art of non-equivalent magnification overlooked image or the art of separation overlooked image.

Figure 13:
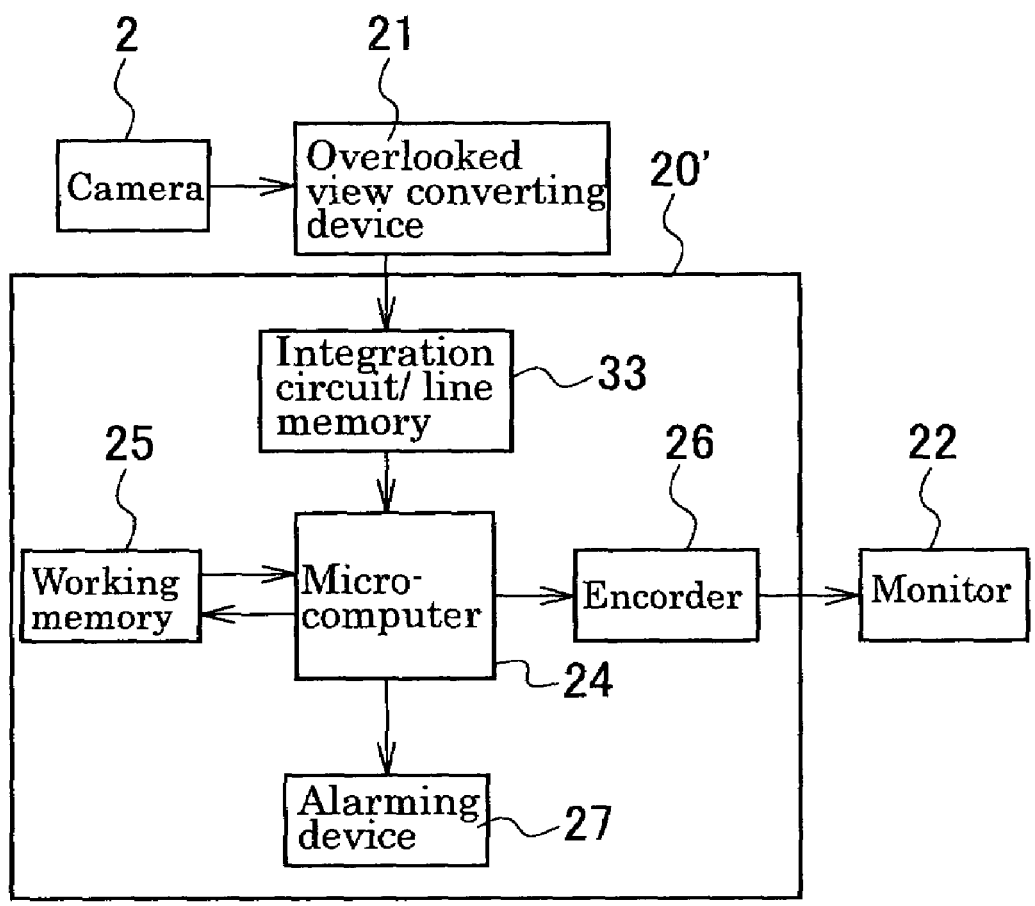
FIG. 13 is a block diagram showing the alarm apparatus for the lane deviation which a frame memory in the alarm apparatus for the lane deviation shown in FIG. 8 is changed with an integration circuit or a line memory.

Next, a method of enhancing a processing speed of the process of detecting the position of the lane markers 13 and 13a will be described hereunder. FIG. 13 shows an alarm apparatus for a lane deviation 20' which the processing speed of the detection of the position of the lane marker is enhanced.

Figure 14:
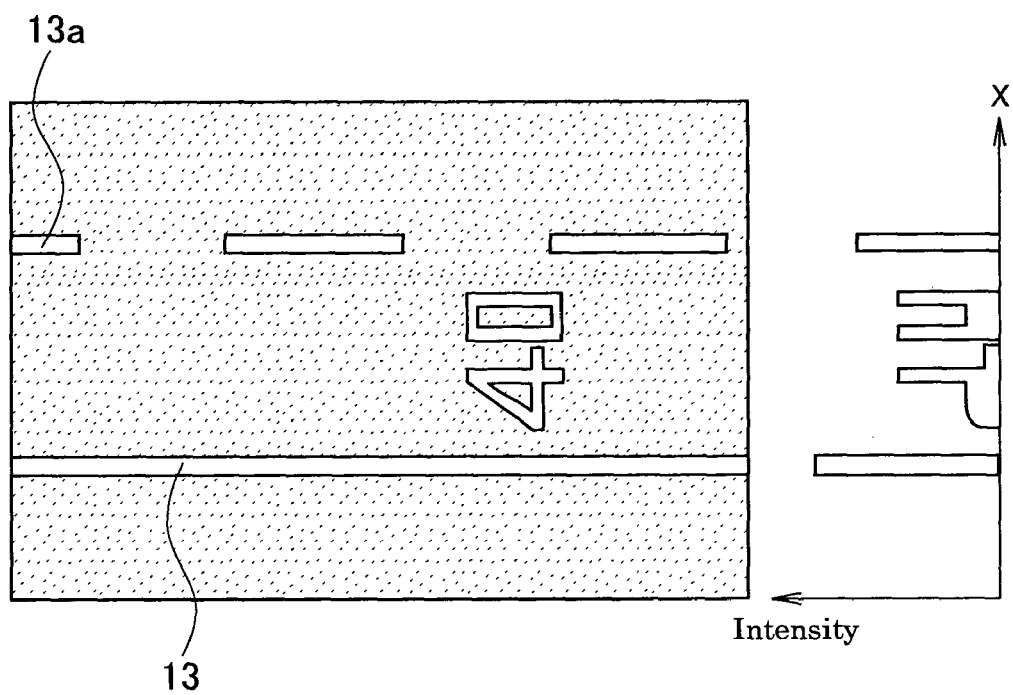
FIG. 14 is a view showing the overlooked image in which an overlooked image data is turned into 90 degrees and the intensity profile created by using overlooked image which is turned into 90 degrees.

First of all, the microcomputer 24 stores the overlooked image created by the overlooked view converting device 21 to the memory 33. The line memory or an integration circuit is used for the memory 33 rather than the frame memory described in FIG. 8. The microcomputer 24 records information regarding a one line portion of the vertical axis of the overlooked image to the line memory 33 and carries out the detecting process of the integral brightness in a one portion of a scanning line of image information. To be more precise, as shown in FIG. 14, the microcomputer 24 carries out the process of an image data of the vertical direction as the image data of the one line portion of the scanning line of the overlooked image that is turned in 90 degrees. Consequently, by creating the intensity profile by using the overlooked image extracted in every one lines, it is possible to distribute and reduce the process of creating the intensity profile carried out in the microcomputer 24.

When creating the intensity profile by using a conventional method, the microcomputer 24 once inputs all the image data regarding the overlooked image to the microcomputer 24 and then carries out a summing calculation to the vertical direction, that is, to a perpendicular direction within the memory of the microcomputer 24. However, the alarm apparatus for the lane deviation 20 can omit the process for transferring all the image data to the microcomputer 24, since the alarm apparatus for the lane deviation 20 is capable of detecting the intensity (integral brightness) of each lines by adding signal that flows continuously in every scanning line in every one line by the line memory 33 without inputting all the image data of the overlooked image to the microcomputer 24. Furthermore, the alarm apparatus for the lane deviation 20 is capable of creating the intensity profile easily by only carrying out an addition of a brightness signal of the one line portion of the scanning line by a simple integration circuit (not shown).

When the overlooked image outputted from the overlooked view converting device 21 is the analog signal (for example, NTSC signal in black and white), the integration circuit carries out a voltage out by integrating by an analog integration circuit and digitalize the voltage by an A/D converter. In addition, since the microcomputer having a built-in A/D converter exists nowadays, it is possible to directly read the analog signal as an integrated result by utilizing such microcomputer. By the way, the analog integration circuit carries out a re-set by synchronize with a horizontal synchronization signal. On the other hand, when the overlooked image is outputted in a digital signal, then directly read out by the microcomputer by adding with a full adder.

Since it is possible to divide the process of creating the intensity profile into every one portion of the scanning line by using the above mentioned method, the alarm apparatus for the lane deviation 20' can reduce the process of the microcomputer 24 by providing a compact sized hardware which carries out the process of creating the intensity profile. In addition, the alarm apparatus for the lane deviation 20' is also possible to carry out the process of creating the intensity profile without subject to a performance of the microcomputer 24 since the process of the microcomputer 24 can be reduced. Also, as the process of reading all the image data by the microcomputer 24 becomes unnecessary, the alarm apparatus for the lane deviation 20' can reduce the time taking for the process of reading all the image data (in a conventional processing method, there have been a situation the reading process of the image data occupies over half of the entire processing time). Since an amount of reading data of the microcomputer 24 can be reduced to 1/several hundreds (resolution of the horizontal axis), the alarm apparatus for the lane deviation 20' can distribute a calculatable resources to the intrinsic process, which is, to detect the lane marker and to carry out the process of alarming of the lane deviation even more.

Next, a method for enhancing an accuracy of detecting the peak intensity of the lane marker 13 in the detection process of the lane marker 13 will be described hereunder.

Figure 15A:
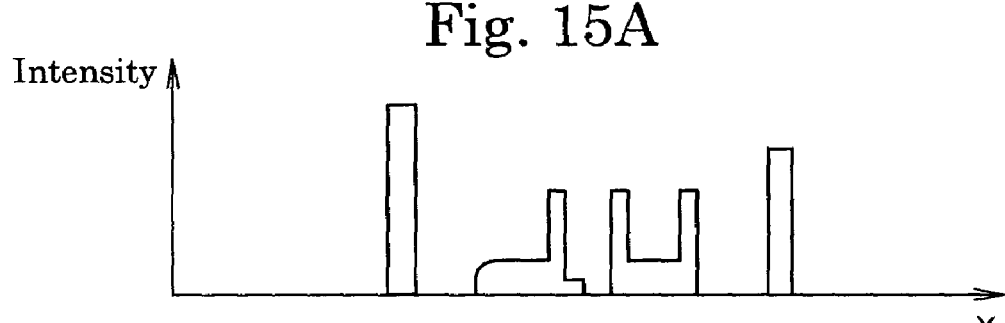
FIG. 15A is a view showing an ideal intensity profile.
Figure 15B:
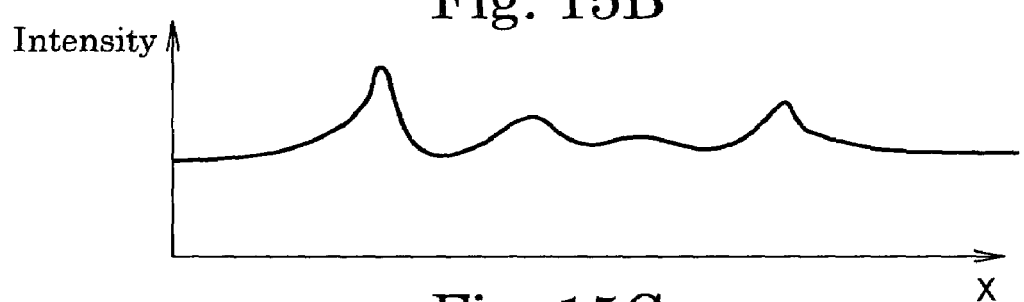
FIG. 15B is a view showing the intensity profile that is actually created.
Figure 15C:
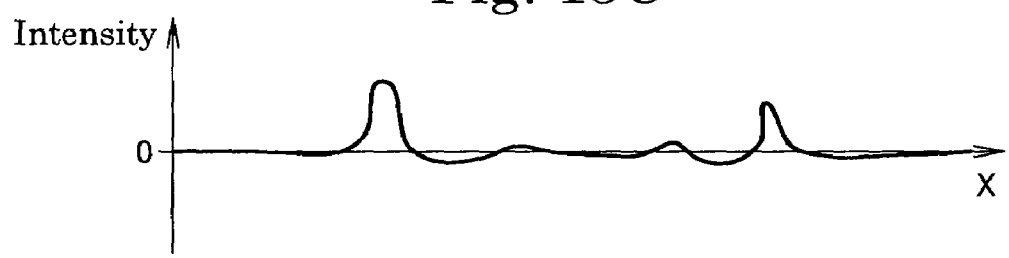
FIG. 15C is a view showing the intensity profile created by using the overlooked image to which a high pass filter is applied.

When the intensity profile created by the overlooked image is an ideal one, such peak intensity is detected in the intensity profile as shown in FIG. 15A. However, in fact, there are many cases that a peak shape becomes ambiguous in such a circumstance that a value of the peak intensity is generally being increased as shown in FIG. 15B since the intensity is also detected from a background signal of the road surface part other than the lane marker 13. On this account, the microcomputer 24 carries out a process of reducing the intensity of the background signal by using a high pass filter as a process of bringing such peak intensity detected in FIG. 15B closer to the peak shape shown in FIG. 15A when creating the intensity profile. FIG. 15C shows the intensity profile having reduced the intensity by using the high pass filter.

By using the high pass filter, the alarm apparatuses for the lane deviation 20 and 20' is not only capable of removing the background signal by reducing an intense low-frequency element, but also capable of reducing the false detection of the position of the lane marker by lowering the intensity of a wide ranged signal (such as a speed limitation marker on the road) with a selection of an appropriate cutoff frequency.

Figure 16:
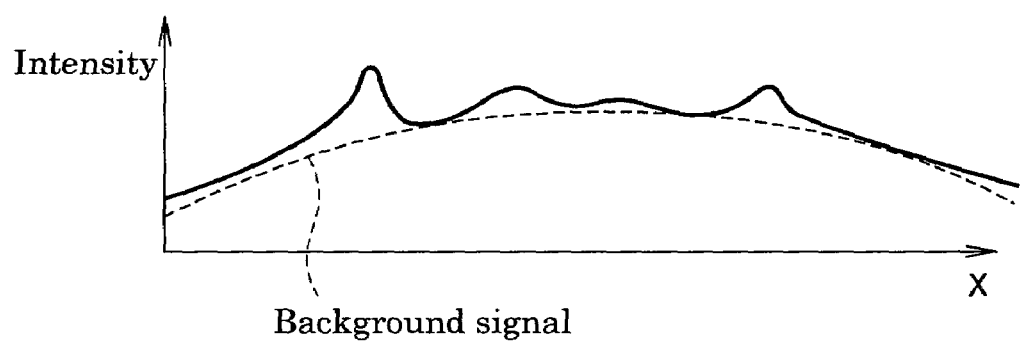
FIG. 16 is a view showing the intensity profile created by using the overlooked image taken by using the wide-angle lens.

Also, if the wide-angle lens is used in the camera 2, it becomes darker as it goes to peripheral part of the image as shown in FIG. 16 due to a trait of lens of the wide-angle lens, and leads to such a circumstance easily that the intensity of the intensity profile deteriorates at both sides of the image. Therefore, the false detection easily occurs because it becomes difficult to carry out a comparison of the intensity between each peak if having evenly reduced only the low-frequency element having the constant intensity regardless of the uneven background signal. The alarm apparatuses for the lane deviation 20 and 20' are capable of reducing only the parts corresponding to the background signal as shown in FIG. 16 even in the case of using the wide-angle lens to the camera 2, because the high pass filter can remove the background signal having gradual changes.

Moreover, since the lane markers 13 and 13a are provided continuously to the lane, the detecting position of the lane marker 13 detected by the lane marker position detection does not change significantly compared with before detection and after detection of the detecting position. Consequently, the alarm apparatuses for the lane deviation 20 and 20' are capable of enhancing the detecting accuracy by creating the intensity profile in view of a temporal change of the detected intensity when creating the intensity profile.

For example, in a case of detecting the intensity of the lane marker 13a that is depicted by interspaced lines, there may be a case that the interspaced lined lane marker 13a is not displayed completely on the overlooked image depending on a timing of shooting when a mounted angle of the camera provided on the vehicle is close to the vertical direction of the vehicle and that cannot shoot so much away, therefore there is a possibility that the interspaced lined lane marker 13a cannot be detected even if the overlooked image is compressed in the vertical direction as shown in FIG. 10. In such a case, it is recommended to create the intensity profile in view of the temporal change in the overlooked image by using the before detection and the after detection of overlooked image.

However, there is a possibility that the peak intensity of the interspaced lined lane marker 13a is falsely detected as the noise or the like since the value of the intensity in the interspaced lined lane marker 13a becomes relatively low even when the intensity profile is created in view of the temporal change.

Figure 17A:
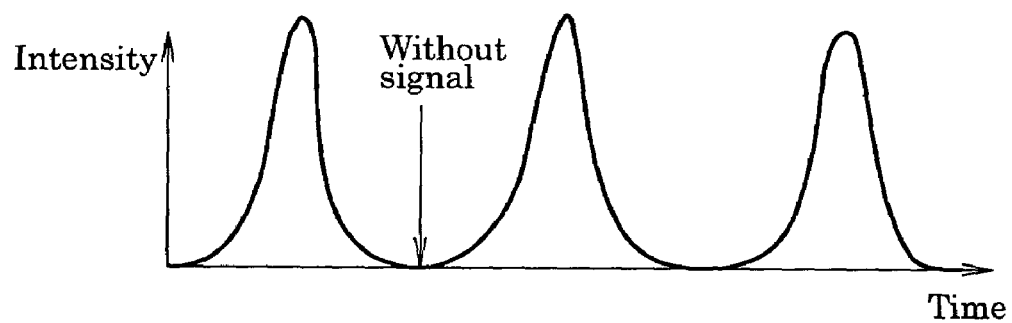
FIG. 17A is a view showing the temporal change of the intensity in the overlooked image in which a low pass filter is not used.
Figure 17B:
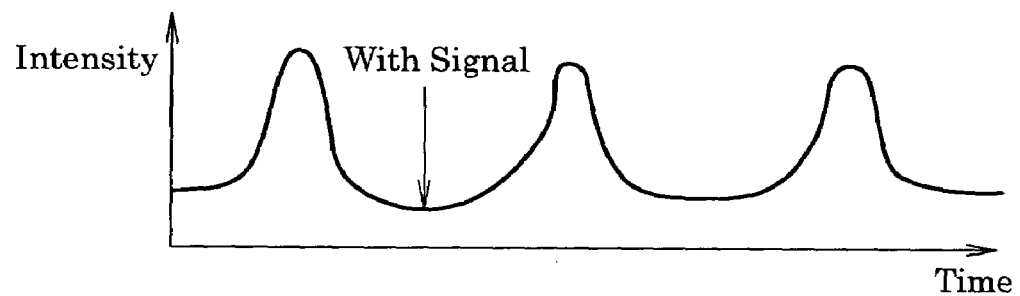
FIG. 17B is a view showing the temporal change of the intensity in the overlooked image in which a low pass filter is used.

Therefore, the microcomputer 24 carries out a compensation of the brightness signal in the interspaced lined lane marker 13a by creating the intensity profile with using a low pass filter for the temporal change of the peak intensity. FIG. 17A shows an intensity change in the detected position of the interspaced lined lane marker 13a is temporally changed by without using the low pass filter, and FIG. 17B shows it is temporally changed by using the low pass filter. The peak intensity is regularly appearing as a signal since the peak intensity is always detected by filtering the temporal change by the low pass filter. By using the low pass filter to a position of the interspaced lined lane marker, the alarm apparatuses for the lane deviation 20 and 20' are capable of carrying out the position detection of the interspaced lined lane marker 13a in any moment. By the way, there may be a case the interspaced peak intensity does not appear on the correct position when abrupt lane change is carried out, since a proportion of a past intensity is high at the place where the intensity of the signal is low (hereunder, such phenomenon is stated as a multi-peak phenomenon). In such a case, the detection of the intensity is carried out by using a "multi-peak correspondence process" which will be described later.

It may be recommendable to adapt the alarm apparatuses for the lane deviation 20 and 20' to determine the position of the lane marker comprehensively by memorizing several lane models (model of the lane marker) previously and comparing with information on the lane marker 13 that is detected by the intensity profile rather than only determining the position of the lane marker 13 by creating the intensity profile based on the overlooked image.

Figure 18:
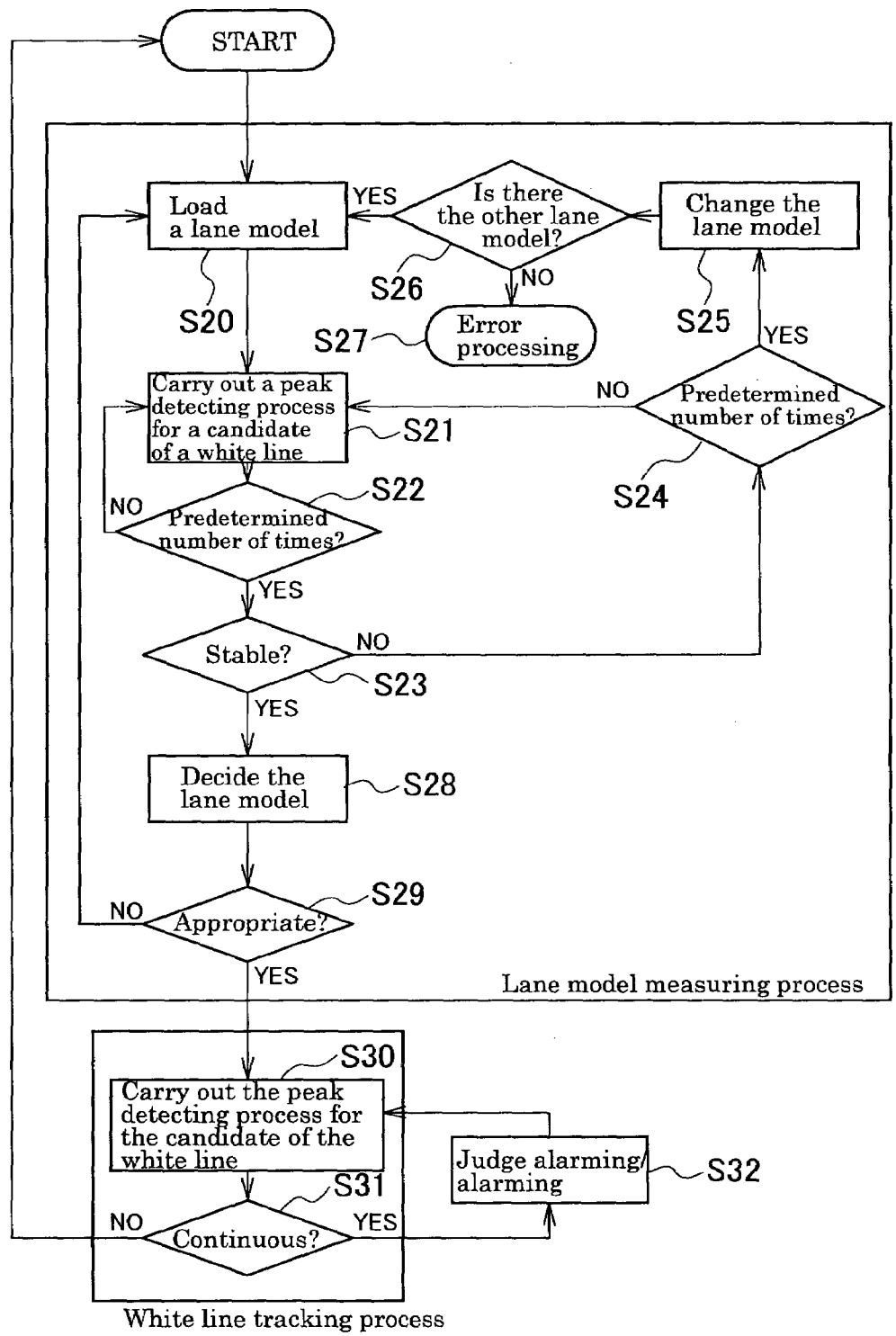
FIG. 18 is a view showing the flowchart showing a process of carrying out an alarming to a driver by detecting a position of lane marker.

The lane model represents a data model having quantified characteristic information on the lane mainly on the lane width of the lane markers 13 and 13a, or distance between the adjacent lane markers 13 and 13a, which is defined based on a common measurement of the lane marker or regulation. FIG. 18 shows a flowchart representing the process of alarming the driver when the microcomputer 24 is determined that the vehicle 3 is deviating of the lane by detecting the position of the lane marker by using the alarm apparatus for the lane deviation 20.

First of all, the microcomputer 24 loads the lane model and records it to the working memory 25 (step S20), then decides the peak intensity that is estimated as the lane markers 13 and 13a by creating the intensity profile of the overlooked image created by the overlooked view converting device 21 and compares it with the loaded lane model (peak detecting process for a candidate of the white line: step S21). The microcomputer 24 repeats the same process for predetermined times such as 30 times (step S22) and after having compared the peak intensity and the lane model for more than the predetermined times, the microcomputer 24 at first determines whether the value obtained by the comparison is stable (consistently constant) or not (step S23). Concretely speaking, the microcomputer 24 determines the stability based on whether distribution of the compared value between the peak intensity in the predetermined times having repeated in the step S21 and the lane model is in certain range (step S23). When determining that it is unstable, the microcomputer 24 obtains how many times has the microcomputer 24 determined that it is unstable based on the loaded lane model (step S24). The microcomputer 24 changes the lane model (step S25) when the number of times having determined unstable in the step S23 is over the predetermined times, which is 10 times for example, and if it is less than the predetermined times, then repeats the peak detecting process for the candidate of the white line (step S21) by using the same lane model again. In a case of changing the lane model (step S25), the microcomputer 24 determines whether there is the lane model that hasn't being loaded yet within the previously recorded lane model (step S26). If there is the lane model that is not loaded, then loads the next lane model (step S20) and if there is no other lane model remaining, then carries out an error processing by determining that there is no lane model that corresponds to the memorized lane model, which is to be more precise, finishes the process by informing to the driver that there is no corresponding lane model (step S27).

When the microcomputer 24 is determined that it is stable in the step S23, decides the lane model (step S28) and determines whether the lane model that is decided by an average of the compared value between the peak intensity and the lane model is adequate or not (step S29). In concrete terms, the microcomputer 24 determines whether or not it is adequate based on whether a shift width between the lane width of the lane marker detected by the intensity profile and the adjoining lane marker is within an allowable range. For example, when the shift of the lane width of the lane marker 13 is within 20–30% and the shift of the lane width of the adjoining lane markers 13 and 13a is within 10–15%, then the microcomputer 24 determines as adequate. When the microcomputer 24 is determined the lane model is as inadequate, the microcomputer 24 loads the next lane model (step S20), and carries out the peak detecting process for the candidate of the white line (step S21). If it is adequate, then carries out a white line tracking process.

In the white line tracking process, the microcomputer 24 exercises the peak detecting process for the candidate of the white line which is carried out in the step S21 and carries out the detection of the lane marker position by obtaining the intensity profile by the overlooked image (step S30). Then, the microcomputer 24 determines whether the detected lane position has not drastically been changed in comparison with the lane marker position detected immediately before, that is, carries out the determination of whether the change in the lane position is continuous or not (step S31). If it is not continuous, the microcomputer 24 determines as the vehicle 3 has changed the lane or a road situation is changed (for example, the number of lanes have changed, the road width is changed or entered to different road by turning at an intersection) and carries out the process in the step 20 in order to detect the lane model that corresponds to the changed lane or the road surface. When the lane marker position is continuously changing, the microcomputer 24 determines whether the vehicle is not deviating or whether there is the possibility of deviating the lane marker by carry out the determination based on the lane model which the position of the changed lane markers 13 and 13a is decided (step S32). If there is the possibility of deviating, then the microcomputer 24 alarms the driver, and if there is no possibility of deviating, then the microprocessor 24 carries out the peak detecting process for the candidate of the white line again (step S30) and repeats the white line tracking process.

As described above, the alarm apparatuses for the lane deviation 20 and 20' are capable of determining easier and faster than in a case determining the position of the lane marker without using the lane model, by carrying out the determination of the deviation of the lane by comparing the detected peak intensity with the lane model. Also, since the alarm apparatuses for the lane deviation determine the change of the vehicle in traveling situation and changes in road circumstance by the continuity of the detected lane marker, it is possible to detect a presence of the changes when the changes are occurred, and furthermore, it is possible to correspond to a circumstance of a new road quickly.

In addition, even if the aforementioned multi-peak phenomenon is occurred by carrying out the determination of the lane deviation using the above mentioned lane model, the alarm apparatuses for the lane deviation 20 and 20' can detect the correct position of the interspaced lined lane marker 13a (multi-peak correspondence process).

Figure 19:
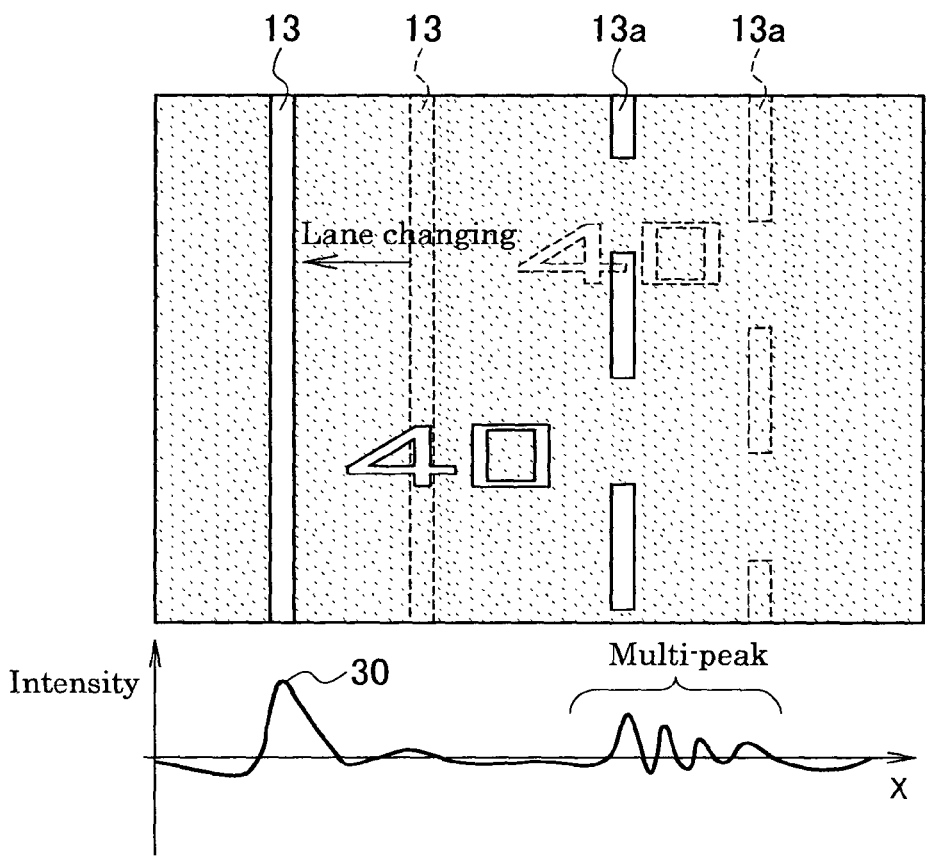
FIG. 19 is a view showing the intensity profile which a multi-peak phenomenon is occurred.

The multi-peak phenomenon occurs easily in a case of creating the intensity profile utilizing past information by using the low pass filter in order to carry out the detection of the interspaced lined lane marker 13a, for example, in such a case that the vehicle is swayed largely due to operation of the lane change or the like when creating the intensity profile. FIG. 19 shows the intensity profile that the multi-peak phenomenon is occurred. Although width of the peak in the peak intensity of the lane marker 13 continues in the direction of traveling only becomes slightly wide as shown by a reference numeral 30, a plurality of small peak appears in the case of the interspaced lined lane marker 13a. It is difficult to determine which is the correct peak when a space between each peak is narrow in the intensity profile the plurality of small peaks is appeared.

When such multi-peak phenomenon is appeared as shown in FIG. 19, the microcomputer 24 determines a part indicating the highest value of the intensity peak (the peak indicated as the reference numeral 30 in FIG. 19) as showing the peak intensity of the continuing lane marker 13. Next, the microcomputer 24 estimates the peak intensity indicating the interspaced lined lane marker from information on the position of the interspaced lined lane marker of the lane model by obtaining the continuing lane marker by the lane model and carries out a concrete coordination between the lane marker position of the lane model and position of the peak intensity of the intensity profile by presuming that the part indicating the highest value of the intensity profile corresponds to the continuing lane marker. Consequently, it is possible to obtain the correct position of the lane marker 13a even in the case the multi-peak phenomenon is occurred by utilizing the lane model.

It should be understood that the multi-peak correspondence process is not to be limited in the case in the multi-peak phenomenon occurs. For example, when the particular position of the lane marker is certain, it is possible to obtain the position of other lane marker from the lane model based on the certain position of the lane marker. In addition, the alarm apparatuses for the lane deviation 20 and 20' can obtain the position of other lane marker in accurate manner regardless of the presence of the multi-peak phenomenon by obtaining the lane marker position by using the multi-peak correspondence process routinely.

Next, a method of detecting the position of the lane marker and the lane width in accurate manner by using a differential filter will be described hereunder.

Figure 20A:
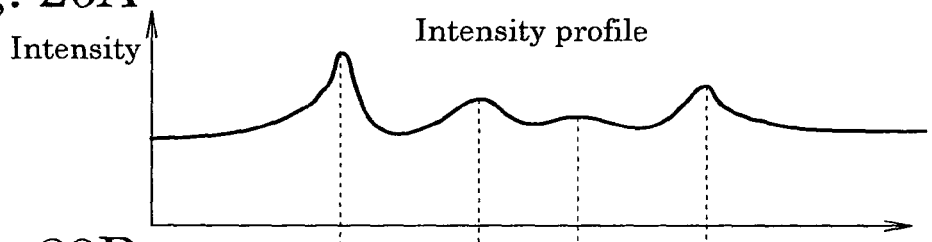
FIG. 20A is a view showing the intensity profile.
Figure 20B:
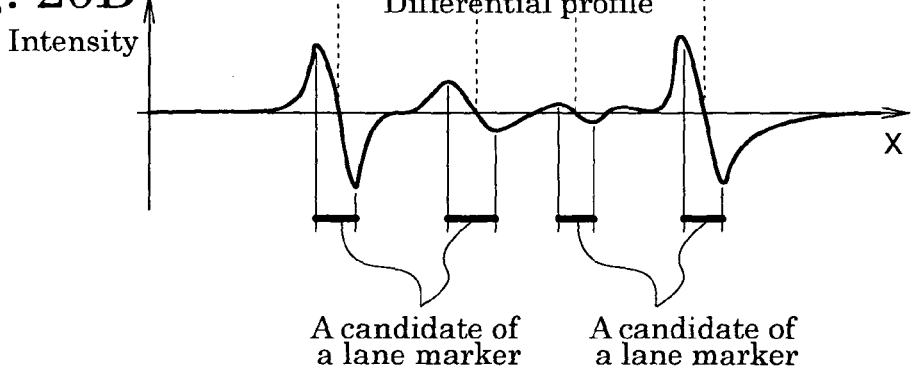
FIG. 20B is a view showing a differential profile having carried out an intensity conversion by using a differential filter to the intensity profile shown in FIG. 20A.

Although the process for reducing the intensity of the background signal by using the high pass filter so as not to detect the background signal as the intensity profile has been described in FIG. 15, an art utilizing the high pass filter has an advantage that its process is relatively easy, on the other hand, there is a problem that it is difficult to correctly evaluate the lane marker position by using the lane model, because the peak shape changes by the influence of high pass filter. In this connection, although it may place some burden on the microcomputer 24 compared with the case utilizing the high pass filter, it is possible to enhance the detecting accuracy of the lane marker position and the width of the lane marker by carrying out the detection of the lane marker position after changing the intensity of the intensity profile by using the differential filter. FIG. 20A shows the intensity profile which is before applying the differential filter, and FIG. 20B shows a differential profile having applied the differential filter to FIG. 20A. In a case of FIG. 20B, since the profile's peak becomes a position of an inflection point in the peak intensity of the lane marker shown in FIG. 20A, number of times (processes) the microcomputer 24 detecting the peak becomes twice. However, since this peak shows both ends position of the lane marker width, it is easy to obtain the lane marker width and the space between the lane markers from the position the peak appears. The width of the lane marker obtained by this method becomes more accurate compared with the case using the high pass filter to obtain the lane marker width.

Next, a method for alarming in a case the microcomputer 24 is determined that the vehicle is deviated of the lane marker or there is the possibility of deviating by using the above mentioned processing method will be described. Three types of alarming methods will be described hereunder, and it is possible to select in accordance with situation which of the alarming method is to be used, as well as capable of concomitant use.

Figure 21A:
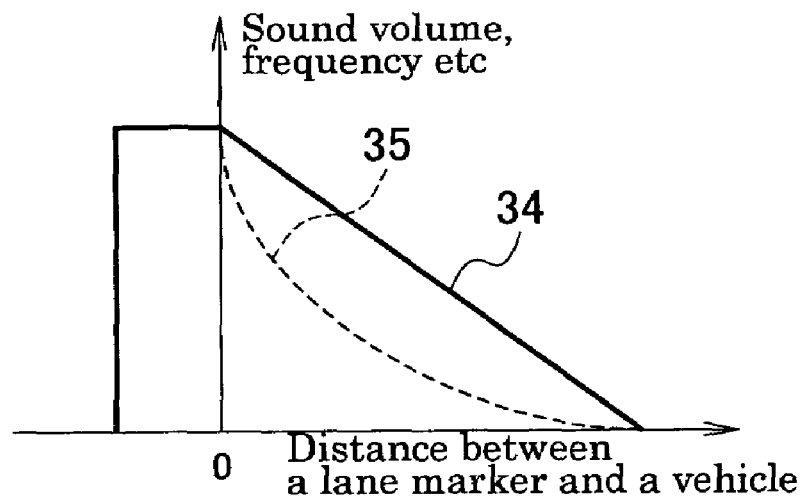
FIG. 21A is a view showing a sound volume and a frequency that are raised as an alarming sound and a corresponding relation of a distance between a lane marker and the vehicle.
Figure 21B:
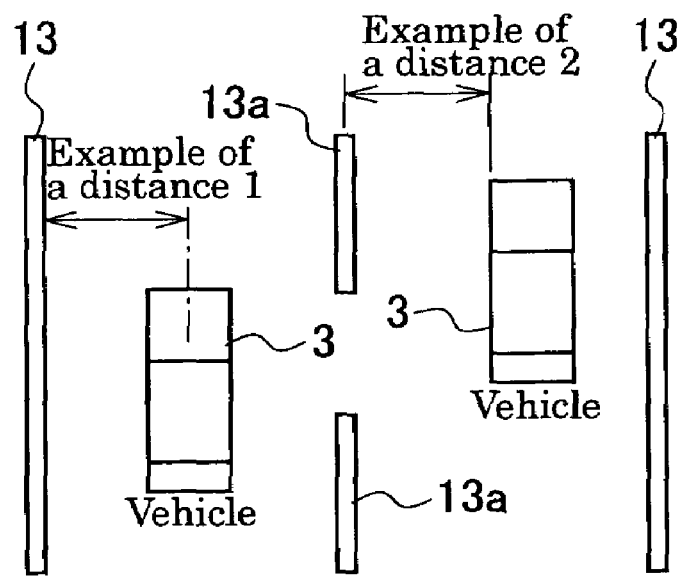
FIG. 21B is a view showing an example of the distance between the vehicle and the lane marker.

First of all, the alarming method that dependent on the distance (distance alarming mode) will be described as a first method. When raising the alarm, timing for alarming the driver is important. In the deviation alarming, although it is a basic operation to raise the alarm when the vehicle is deviated, it is preferable to raise the alarm when the vehicle is moved closer to the lane marker prior to the deviation so that the driver could forestall the lane deviation. Therefore, the microcomputer 24 notifies information on danger precisely to the driver by raising different alarming sounds corresponding to the distance from the lane markers 13 and 13*a* to the vehicle 3 (example of distance 1 or example of distance 2 shown in FIG. 21B) as shown in FIG. 21. For example, as shown in FIG. 21A, the alarm apparatuses for the lane deviation 20 and 20' can carry out the alarming corresponding to degree of risk of the lane deviation by increasing a sound volume or increasing a frequency as the vehicle 3 goes closer to the lane markers 13 and 13*a*. As the way of alarming, it is also recommendable to carry out not only the alarming by using either of the sound volume or the frequency of the alarming sound but also alarming by using both of them at the same time. When alarming by using a human voice, it is preferable to alarm in accordance with a volume characteristic shown in FIG. 21A. Also, when changing the alarm according to the distance, it is recommendable to change its changing rate as linearly as indicated in a reference numeral 34 in FIG. 21A or in quadric as indicated as a reference numeral 35. When raising the alarm in proportion to the distance between the lane markers 13 and 13*a*, there may be a case that the alarming sound is raised even when the vehicle has changed the lane, so the microcomputer 24 stops the alarming by determining that the vehicle 3 changes the lane when the distance between the lane marker 13 and the vehicle 3 is exceeded the certain distance.

A second method that carries out the alarming not only considers the distance but also considers vehicle's traversing speed (distance-speed alarming mode) will be described hereunder. In the method that simply carries out the alarming corresponding to the distance between the lane markers 13 or 13*a* and the vehicle 3 as stated above, there is the possibility that the alarm apparatuses for the lane deviation 20 and 20' may raise the alarm even though the vehicle is in relatively safe traveling situation in a case the driver of the vehicle 3 who has a habit to safely drives the car in proximity to the lane marker 13.

Given this factor, the second alarming method does not simply raises the alarm corresponding to the distance between the lane marker 13 and the vehicle 3, rather, the second alarming method carries out the alarming corresponding to the distance between the lane marker 13 and the vehicle 3 when the vehicle 3 has traversed over a predetermined speed by a speed the vehicle 3 is moving close to the lane marker 13 (traversing speed) determined by the microcomputer 24, and the microcomputer 24 does not carry out the alarming when the vehicle 3 is traversing below of the predetermined speed.

It may be recommendable to provide so that the driver can set a value of the predetermined speed or provide the microcomputer 24 to set automatically corresponding to each driver by learning. By changing over the timing of carrying out the alarming by operation of the driver or automatic setting of the microcomputer 24, the alarm apparatuses for the lane deviation 20 and 20' can carry out the most suitable alarming corresponding to the driver who is driving the vehicle 3.

Figure 22:
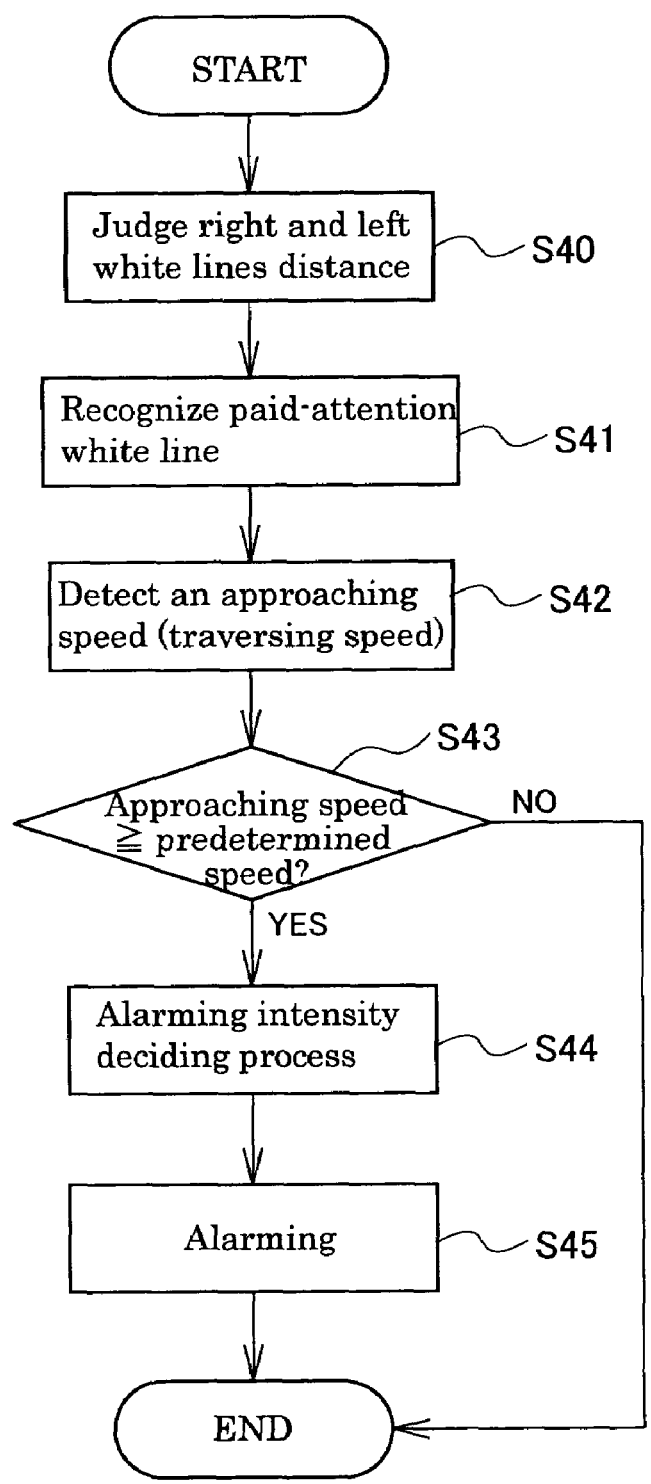
FIG. 22 is a first flowchart showing a process for the microcomputer to carry out the alarming.

FIG. 22 is a flowchart indicating a process of the microcomputer 24 which changes over ways of alarming corresponding to the traversing speed. At first, the microcomputer 24 judges which of the right or left lanes markers 13 and 13*a* the vehicle is closer by using the intensity profile or the like (step S40), and recognizes the closer lane marker 13 as a white line that is to pay attention (step S41). Next, the microcomputer 24 obtains the distance between the paid-attention white line and the vehicle 3 and detects an approaching speed (traversing speed) to the paid-attention white line (step S42) and determines whether the vehicle 3 is moving close to the paid-attention white line with the speed exceeding the predetermined speed or not (step S43). When the microcomputer 24 determines that the vehicle 3 is moving toward the paid-attention white line over the predetermined speed, the microcomputer 24 carries out a decision of the alarming sound corresponding to the distance to the paid-attention white line (alarming intensity deciding process, step S44) and carries out the alarming with the decided alarming sound (step S45). The alarming will not be carried out if the approaching speed is below of the predetermined speed.

It may be recommendable to enable the microcomputer provide to change over between the alarming methods described as the first alarming method (distance alarming mode) and the alarming method described as the second alarming method (distance-speed alarming mode) by the automatic learning of the microcomputer 24. In a case of changing over the alarming methods by an automatic setting of the microcomputer 24, it may be recommendable to adapt the microcomputer 24 to monitor an alarming time while the distance alarming mode is in operation and carry out an alteration of the alarming method (operating mode) when a situation of raising the alarm is continued for over the predetermined time or over a predetermined traveling distance. It may also be recommendable for the driver to alter the alarming methods by the notification of the microcomputer 24 to the driver rather than the microcomputer 24 changing the alarming methods automatically.

Figure 23:
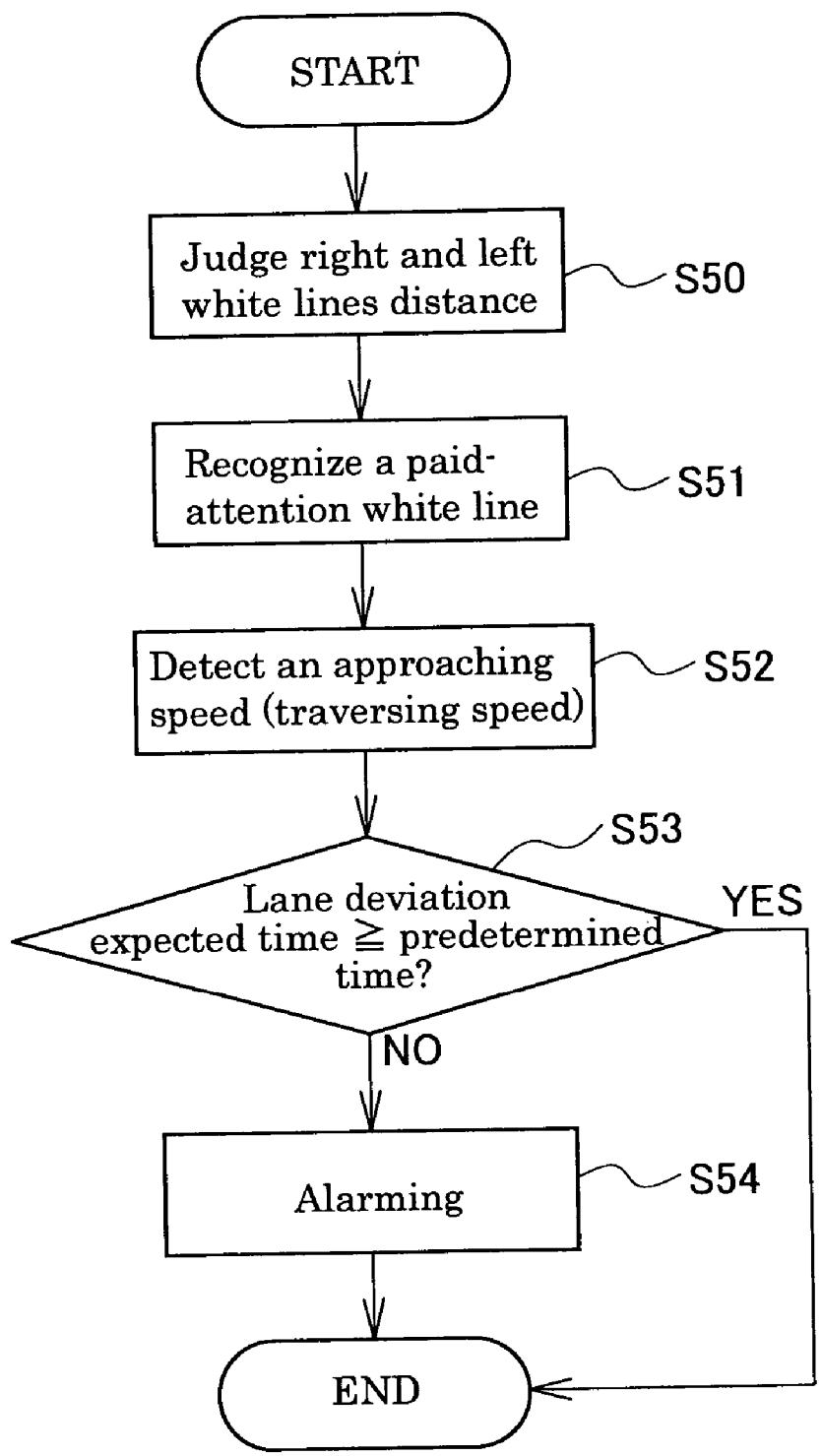
FIG. 23 is a second flowchart showing the process for the microcomputer to carry out the alarming.

A third method of carrying out the alarming obtains a time until the vehicle deviates the lane by using the traversing speed and determines whether to carry out the alarming or not corresponding to the obtained time will be described with reference to FIG. 23 (time alarming mode).

At first, the microcomputer 24 judges which of the right or left lanes markers the vehicle is closer by using the intensity profile or the like (step S50), and recognizes the closer lane marker as the white line that should pay an attention (step S51) as similar to above mentioned alarming method, which is the distance-speed alarming mode. Next, the microcomputer 24 obtains the distance between the paid-attention white line and the vehicle 3 and detects the approaching speed (traversing speed) to the paid-attention white line (step S52) and detects in how many second the vehicle takes to deviate the paid-attention white line (expected time to deviate the lane) by dividing the distance to the paid-attention white line by the approaching speed (step S53).

The microcomputer 24 does not raise the alarm if determines that it takes over the predetermined time for the vehicle 3 to be deviated, and raises the alarm if determines that the vehicle deviates within the predetermined time (step S54). Consequently, for example, even while the vehicle 3 is traveling in middle of the lanes, the alarming is carried out because the microcomputer 24 determines that it takes a short time to deviate the lane when an abrupt handling operation is carried out, and even when the vehicle is traveling near by to the lane, the alarming is not carried out because the microcomputer 24 determines that it takes over the predetermined time to deviate the lane. Therefore, as the alarming is carried out in accordance with behavior of the vehicle 3, the alarm apparatuses for the lane deviation 20 and 20' can serve more appropriate information.

As described above, although the apparatus for detecting the position of the lane marker relating to the present invention has been described in the embodiment 1 and the alarm apparatus for the lane deviation has been described in the embodiment 2, it should be understood that the apparatus for detecting the position of the lane marker and the alarm apparatus for the lane deviation relating to the present invention are not limited within the above described embodiments. For example, by concomitantly using "the process for detecting the position of the lane marker by obtaining the coordinate of the horizontal Y axis indicates the highest integral brightness" which has been described using the first flowchart and "the process for detecting the position of the lane marker by obtaining the coordinate width of the group of coordinate of the horizontal Y axis having the high integral brightness" which has been described using the second flowchart, the apparatus for detecting the position of the lane marker 1 can carry out the detection of the lane marker position more accurately.

Additionally, in the embodiments of the present invention as described above, although there is only one camera 2 provided on the vehicle 3 as shown in FIG. 2, it should be understood that the number of cameras are not to be limited to one, and it is recommendable to provide several cameras. By providing the plurality of cameras, it is possible to take the image in wide area, since it is possible to take the image of the road surface from multiple angles compared with a case that the camera 2 is only provided one, therefore dead angle can be reduced.

Still additionally, in the embodiments of the present invention, although the case of taking the image of the road surface at the back of the vehicle 3 by providing the camera 2 at the back of the vehicle 3 has been described as shown in FIG. 2, it should be understood that the position of providing the camera 2 or the direction of taking the image are not to be limited to the position or the direction as stated above.

It is possible to perform the detection of the lane marker position by providing the camera 2 at wherever position such as the forward or lateral of the vehicle or setting the camera to take the image of wherever direction of the road surface as long as the road surface and the lane marker is taken in the taken image.

Also, in the embodiments of the present invention, although the apparatus for detecting the position of the lane marker 1 has the overlooked view converting unit 8, the intensity profile creating unit 9, the memory unit 10 and the lane marker detecting unit 11, it may be recommendable to constitute all those units by different semiconductor device or constitute all those units by assembling them into one semiconductor device. For example, even in a case of performing the detection of the lane marker position by adapting a commonly used CPU to process a function of the above mentioned device and adapting it to exercise a program corresponding to a process the CPU performs, it is possible to attain the same effect of the present invention as well as in the alarm apparatus for the lane deviation.

What is claimed is:

1. A method for detecting a position of a lane marker provided on a road surface, comprising steps of:
    photographing an image of the road surface by a camera loaded on a vehicle;
    converting the image of said road surface taken by said camera into an overlooked image;
    obtaining an integral brightness by integrating a brightness of a coordinate in a direction perpendicular to a direction of a road width of said road surface that is indicated on the converted overlooked image and detecting the integral brightness in every coordinate which is in said road width direction; and
    obtaining a position of said road surface corresponding to the coordinate in said road width direction in that a high integral brightness is indicated.

2. The method according to claim 1, further comprising steps of:
    obtaining the coordinate in said road width direction indicating the high integral brightness in the other coordinate except for a coordinate in said road width direction indicating a highest integral brightness and a coordinate proximity to thereto;

thereby carrying out the detection of the position of the lane marker again.

3. A method for detecting a position of a lane marker provided on a road surface, comprising steps of:
photographing an image of the road surface by a camera loaded on a vehicle;
converting the image taken by said camera into an overlooked image;
obtaining an integral brightness by integrating a brightness of a coordinate in a direction perpendicular to a direction of a road width of said road surface that is indicated by the converted overlooked image, and detecting the integral brightness in every coordinate in said road width direction;
obtaining a width of a group of coordinate which the coordinate in which a high integral brightness is indicated in said road width direction and a coordinate proximity to the coordinate and which indicate a higher integral brightness than the other coordinate; and
obtaining a position of said road surface corresponding to said group of coordinate if said coordinate width corresponds to a specified value of said lane marker when comparing said coordinate width and the specified value of said lane marker in said road width direction.

4. An apparatus for detecting a position of a lane marker comprising:
overlooked view converting means for converting an image of a road surface that is taken by a moving vehicle into an overlooked image;
brightness profile creating means for creating a brightness profile by obtaining an integral brightness which is obtained by integrating a brightness of a coordinate in a direction perpendicular to a road width direction of said road surface in said converted overlooked image and by detecting the integral brightness in every coordinate in said road width direction;
high brightness coordinate detecting means for obtaining the coordinate in said road width direction indicating a high integral brightness from the brightness profile; and
road surface position detecting means for obtaining a position of said road surface corresponding to the coordinate obtained by the high brightness coordinate detecting means; wherein
said apparatus detects said position of the lane marker by the position of said road surface obtained by said road surface position detecting means.

5. The apparatus according to claim 4, further comprising:
overlooked image compressing means for compressing the converted overlooked image by said overlooked view converting means in the direction perpendicular to said road width direction after deleting a part other than the road surface; wherein
said brightness profile creating means creates said brightness profile by using the overlooked image which is compressed by said overlooked image compressing means.

6. The apparatus according to claim 4, further comprising:
amended overlooked image creating means for creating an amended overlooked image which is a vehicle width of said moving vehicle in the overlooked image and having deleted a part of the image extending in a direction of the vehicle traveling from the converted overlooked image by said overlooked view converting means; wherein said brightness profile creating means creates said brightness profile by using the amended overlooked image which is created by said amended overlooked image creating means.

7. The apparatus according to claim 4, wherein:
said brightness profile creating means creates said brightness profile by turning said overlooked image so that the direction perpendicular to the road width direction of said road surface and a direction of a scanning line of said overlooked image to coincide and by obtaining the integral brightness in every said scanning line.

8. The apparatus according to claim 7, wherein:
said brightness profile creating means has an analog integration circuit;
said analog integration circuit obtains the integral brightness in said scanning line when said overlooked image is constituted by an analog data.

9. The apparatus according to claim 7, wherein:
said brightness profile creating means has a full adder;
said full adder obtains the integral brightness in said scanning line when said overlooked image is constituted by a digital data.

10. The apparatus according to claim 4, further comprising:
integral brightness extracting means for extracting only the integral brightness which is over a certain value in said brightness profile by applying a high pass filter to the brightness profile which is created by said brightness profile creating means; wherein
said high brightness coordinate detecting means obtains said coordinate which is indicated the high integral brightness among the integral brightness which is extracted by said integral brightness extracting means.

11. The apparatus according to claim 4, wherein:
said high brightness coordinate detecting means obtains the coordinate of a position of inflection point in said brightness profile by applying a differential filter to the brightness profile which is created by said brightness profile creating means; and
said road surface position detecting means obtains the position of the road surface of said lane marker and a lane width of said lane marker based on the coordinate of said position of inflection point which is obtained by said brightness profile creating means.

12. The apparatus according to claim 4, wherein:
said high brightness coordinate detecting means obtains the coordinate indicated the high integral brightness by sequentially detecting the integral brightness of the brightness profile which is created by said brightness profile creating means using a low pass filter.

13. The apparatus according to claim 4, further comprising:
lane model memorizing means for memorizing a plurality of lane models in which a line width of a lane marker and a space of an adjoining lane marker are different; wherein
said road surface position detecting means extracts the lane model which correspond to a lane condition in said road surface from the lane model that is memorized by said lane model memorizing means by the space of the coordinate obtained by said high brightness coordinate detecting means and detects the position of said lane marker in consideration of the space of the lane marker of extracted lane model and the line width.

14. The apparatus according to claim 13, wherein:
when said high brightness coordinate detecting means is obtained the coordinate indicating the high integral brightness and a plurality of neighboring coordinate indicating a lower integral brightness than the integral brightness of the coordinate indicating the high integral brightness from said brightness profile, said road surface position detecting means extracts said lane model from said lane model memorizing means and detects the lane marker corresponding to said coordinate indicating the high integral brightness from the extracted lane model, thereby detecting a position of adjoining interspaced lined lane marker by a relation between said lane model and said coordinate indicating the low integral brightness based on the lane marker.

15. An apparatus for detecting a position of a lane marker comprising:

overlooked view converting means for converting an image of a road surface taken by a moving vehicle into an overlooked image;

brightness profile creating means for creating a brightness profile by obtaining an integral brightness which is obtained by integrating a brightness of a coordinate in a direction perpendicular to a road width direction of said road surface in said converted overlooked image and by detecting the integral brightness in every coordinate in said road width direction;

high brightness coordinate detecting means for obtaining a width of a group of coordinate which the coordinate in which a high integral brightness is indicated in said road width direction and a coordinate proximity to the coordinate and which indicate a higher integral brightness than the other coordinate from the brightness profile; and road surface position detecting means for obtaining a position of said road surface corresponding to said group of coordinate if said coordinate width corresponds to a specified value of said lane marker when comparing said coordinate width and the specified value of said lane marker in said road width direction; wherein said apparatus detects said position of the lane marker by the position of said road surface obtained by said road surface position detecting means.

16. An alarm apparatus for a lane deviation comprising:

a device for detecting a position of a lane marker;

distance calculating means for calculating a distance between a moving vehicle and a lane marker which is nearest to the moving vehicle by the position of the lane marker that is detected by said device for detecting the position of the lane marker;

first alarm raising means for raising a different alarming sound to a driver corresponding to the distance calculated by said distance obtaining means;

said device for detecting the position of the lane marker comprised of overlooked view converting means for converting an image of a road surface that is taken by the moving vehicle into an overlooked image;

brightness profile creating means for creating a brightness profile by obtaining an integral brightness which is obtained by integrating a brightness of a coordinate in a direction perpendicular to a road width direction of said road surface in said converted overlooked image and by detecting the integral brightness in every coordinate in said road width direction;

high brightness coordinate detecting means for obtaining the coordinate in said road width direction indicating a high integral brightness from the brightness profile; and road surface position detecting means for obtaining a position of said road surface corresponding to the coordinate obtained by the high brightness coordinate detecting means.

17. An alarm apparatus for a lane deviation comprising:

a device for detecting a position of a lane marker;

lane marker detecting means for obtaining a lane marker which is most nearest to a moving vehicle by the position of the lane marker that is detected by said device for detecting the position of the lane marker;

traversing speed detecting means for detecting a traversing speed of said moving vehicle;

second alarm raising means for raising an alarm to a driver when said moving vehicle moved to a side of the lane marker that is detected by said lane marker detecting means and when the traversing speed of said moving vehicle is over a predetermined speed;

said device for detecting the position of the lane marker comprised of overlooked view converting means for converting an image of a road surface that is taken by the moving vehicle into an overlooked image;

brightness profile creating means for creating a brightness profile by obtaining an integral brightness which is obtained by integrating a brightness of a coordinate in a direction perpendicular to a road width direction of said road surface in said converted overlooked image and by detecting the integral brightness in every coordinate in said road width direction;

high brightness coordinate detecting means for obtaining the coordinate in said road width direction indicating a high integral brightness from the brightness profile; and road surface position detecting means for obtaining a position of said road surface corresponding to the coordinate obtained by the high brightness coordinate detecting means.

18. The alarm apparatus for a lane deviation according to claim 17, wherein said moving vehicle is provided with a velocity sensor for detecting a vehicle velocity and a steering angle sensor for detecting a steering angle of a steering wheel; and said traversing speed detecting means detects said traversing speed based on the vehicle velocity detected by the velocity sensor and the steering angle detected by the steering angle sensor.

19. The alarm apparatus for a lane deviation according to claim 17, wherein said traversing speed detecting means detects said traversing speed by measuring a temporal change of the distance calculated by said distance calculating means.

20. An alarm device for a lane deviation comprising:

a device for detecting a position of a lane marker;

lane distance detecting means for obtaining a lane marker which is nearest to a moving vehicle and a distance to the lane marker by the position of the lane marker that is detected by said device for detecting the position of the lane marker;

traversing speed detecting means for detecting a traversing speed of said moving vehicle;

first alarm raising means for raising a different alarming sound to a driver corresponding to the distance obtained by said lane distance detecting means; and second alarm raising means for raising an alarm to the driver when said moving vehicle moved to a side of the lane marker that is detected by said lane distance detecting means and when the traversing speed of said moving vehicle is over a predetermined speed; wherein said first alarm raising means discontinues said alarming when a situation that said distance is below of a predetermined distance is continued for a predetermined time or a predetermined moving distance;

said second alarm raising means carries out an alarming to said driver after the alarming of said first alarm raising means is discontinued;

said device for detecting the position of the lane marker comprised of overlooked view converting means for converting an image of a road surface that is taken by the moving vehicle into an overlooked image;

brightness profile creating means for creating a brightness profile by obtaining an integral brightness which is obtained by integrating a brightness of a coordinate in a direction perpendicular to a road width direction of said road surface in said converted overlooked image and by detecting the integral brightness in every coordinate in said road width direction;

high brightness coordinate detecting means for obtaining the coordinate in said road width direction indicating a high integral brightness from the brightness profile; and road surface position detecting means for obtaining a position of said road surface corresponding to the coordinate obtained by the high brightness coordinate detecting means.

21. An alarm apparatus for a lane deviation comprising:

a device for detecting a position of a lane marker;

distance calculating means for calculating a distance between a moving vehicle and a lane marker which is nearest to the moving vehicle by the position of the lane marker that is detected by said device for detecting the position of the lane marker;

traversing speed detecting means for detecting a traversing speed of said moving vehicle;

third alarm raising means for raising an alarm to a driver when a calculated time is below of a predetermined time by calculating the time until said moving vehicle deviates said lane marker by using said distance calculated by said distance calculating means and said traversing speed detected by said traversing speed detecting means;

said device for detecting the position of the lane marker being comprised of overlooked view converting means for converting an image of a road surface that is taken by the moving vehicle into an overlooked image;

brightness profile creating means for creating a brightness profile by obtaining an integral brightness which is obtained by integrating a brightness of a coordinate in a direction perpendicular to a road width direction of said road surface in said converted overlooked image and by detecting the integral brightness in every coordinate in said road width direction;

high brightness coordinate detecting means for obtaining the coordinate in said road width direction indicating a high integral brightness from the brightness profile; and road surface position detecting means for obtaining a position of said road surface corresponding to the coordinate obtained by the high brightness coordinate detecting means.

* * * * *